(12) United States Patent
Ganong et al.

(10) Patent No.: US 11,080,384 B2
(45) Date of Patent: Aug. 3, 2021

(54) SYSTEMS AND METHODS FOR AUTHENTICATION USING DIGITAL SIGNATURE WITH BIOMETRICS

(71) Applicant: APPLIED RECOGNITION INC., Oakville (CA)

(72) Inventors: Ray Ganong, Stoney Creek (CA); Donald Craig Waugh, Oakville (CA); Jakub Dolejs, London (GB); Tomasz Wysocki, Toronto (CA); Chris Studholme, Ottawa (CA)

(73) Assignee: APPLIED RECOGNITION CORP., Oakville (CA)

(*) Notice: Subject to any disclaimer, the term of this patent is extended or adjusted under 35 U.S.C. 154(b) by 524 days.

(21) Appl. No.: 16/062,546

(22) PCT Filed: Dec. 15, 2016

(86) PCT No.: PCT/CA2016/051484
§ 371 (c)(1),
(2) Date: Jun. 14, 2018

(87) PCT Pub. No.: WO2017/100929
PCT Pub. Date: Jun. 22, 2017

(65) Prior Publication Data
US 2018/0373859 A1  Dec. 27, 2018

Related U.S. Application Data

(60) Provisional application No. 62/267,758, filed on Dec. 15, 2015.

(51) Int. Cl.
*G06F 21/00* (2013.01)
*G06F 21/36* (2013.01)
(Continued)

(52) U.S. Cl.
CPC .............. *G06F 21/36* (2013.01); *G06F 21/32* (2013.01); *G06F 21/64* (2013.01);
(Continued)

(58) Field of Classification Search
CPC .......... G06F 21/32; G06F 21/64; G06F 21/36; G06F 2221/2103; H04L 9/3231;
(Continued)

(56) References Cited

U.S. PATENT DOCUMENTS

| 6,553,494 B1 | 4/2003 | Glass |
| 7,216,083 B2 | 5/2007 | Paemelee et al. |

(Continued)

FOREIGN PATENT DOCUMENTS

| EP | 2784723 A2 | 10/2014 | |
| WO | WO-2007034255 A1 * | 3/2007 | ........... H04L 9/3247 |

OTHER PUBLICATIONS

International Search Report and Written Opinion issued in International Application No. PCT/CA2016/051484, dated Mar. 8, 2017.

*Primary Examiner* — Trong H Nguyen
(74) *Attorney, Agent, or Firm* — Norton Rose Fulbright Canada LLP

(57) ABSTRACT

An encryption/decryption system to provide a means for user authentication and document authentication using face biometrics. The encryption/decryption system comprises a key storage means for storing a plurality of keys, a face authentication means for determining whether a prospective user of a key in the plurality of keys is the associated user of the key, an encryption/decryption means for encrypting and decrypting data using the plurality of keys when the face authentication means authenticates the prospective user, and a document authentication means that authenticates the user for access to their plurality of keys to digitally sign a document and display the users face used to authenticate (Continued)

access to their plurality of keys in or associated with the document acting as a witness to the signing of the document.

17 Claims, 12 Drawing Sheets

(51) Int. Cl.
    *G06F 21/32*     (2013.01)
    *G06F 21/64*     (2013.01)
    *H04L 9/32*     (2006.01)
    *G06K 9/00*     (2006.01)
    *G06T 7/70*     (2017.01)
    *G06K 9/20*     (2006.01)
    *G06K 9/62*     (2006.01)

(52) U.S. Cl.
    CPC ..... *G06K 9/00268* (2013.01); *G06K 9/00288* (2013.01); *H04L 9/3231* (2013.01); *H04L 9/3247* (2013.01); *H04L 9/3271* (2013.01); *G06F 2221/2103* (2013.01); *G06K 9/00597* (2013.01); *G06K 9/00926* (2013.01); *G06K 9/2027* (2013.01); *G06K 9/6247* (2013.01); *G06T 7/70* (2017.01); *G06T 2207/20182* (2013.01)

(58) Field of Classification Search
    CPC ...... H04L 9/3247–3257; H04L 9/3271; G06K 9/00268–00281; G06K 9/00288–00295; G06K 9/00885–00926; G06K 9/2027; G06K 9/00597; G06K 9/00926; G06K 9/6247; G06T 2207/20182; G06T 7/70
    See application file for complete search history.

(56) References Cited

U.S. PATENT DOCUMENTS

| | | | |
|---|---|---|---|
| 10,002,286 B1 * | 6/2018 | Prabhu | G06K 9/00288 |
| 2002/0129257 A1 * | 9/2002 | Parmelee | G06Q 20/4037 |
| | | | 713/180 |
| 2003/0007685 A1 * | 1/2003 | Tsai | G06K 9/00268 |
| | | | 382/167 |
| 2013/0129159 A1 | 5/2013 | Huijgens et al. | |
| 2014/0161326 A1 * | 6/2014 | Ganong | G06F 16/50 |
| | | | 382/118 |
| 2016/0057138 A1 * | 2/2016 | Hoyos | G06Q 20/40145 |
| | | | 726/7 |

* cited by examiner

Eye detection

SYSTEMS AND METHODS FOR AUTHENTICATION USING DIGITAL SIGNATURE WITH BIOMETRICS

CROSS REFERENCE TO RELATED APPLICATIONS

This application is a National Stage entry of PCT patent application no. PCT/CA2016/051484 filed Dec. 15, 2016 and claims priority to U.S. provisional application 62/267,758 filed Dec. 15, 2015 and entitled "SYSTEMS AND METHODS FOR AUTHENTICATION USING DIGITAL SIGNATURE WITH BIOMETRICS".

FIELD

The present disclosure relates to the authentication of individuals and individuals' photo identification credentials, and to the authentication of documents or transactions signed or approved by individuals using facial biometrics in order to perform authentication and present visible proof via the users face integrated with digital signature technology.

INTRODUCTION

Asymmetric encryption keys and PKI Public Key Infrastructure technology may be used for security purposes. A benefit of asymmetric keys is the ability to prove the source of a message or document which may be referred to as a digital signature.

However encryption is only as good as the password that protects access to a user's private key. Face biometrics can replace passwords. Unlike a password, a real face cannot be written down, lost, forgotten, shared or stolen. Face biometrics offer significant additional advantages over other known authentication methods, such as:
  Something you know: passwords: random challenge questions, or images.
  Something you own: smart cards, dongles, RSA SecurID hardware authenticators.
  Something you are: iris pattern, fingerprints, voiceprint, heartbeat.

Some advantages provided by face biometrics (e.g. something you are) authentication may include:
  Persistent session authentication—as long as a person is in front of the camera on their laptop, tablet or smart phone, the user can be continuously authenticated;
  Authenticates photo-ID (e.g., passports, identification cards, etc.)—government issued identity documents typically include a photo of the card holder. Face authentication can authenticate the photo-ID to the card holder and card holder to the photo-ID;
  Viewable proof of a person—humans use faces in the analog (real) world to authenticate one another's identity. Face biometrics may be the only authentication method that nearly all humans can see and understand;
  Widest array of anti-spoofing techniques—while passwords based on something you know or something you own may be guessed or stolen, there are few if any methods to spoof or otherwise evade authentication methods based on something you are. This includes "liveness" detection to differentiate between 2D images and other facsimiles. Face biometrics offer superior anti-spoofing methods;
  Crooks may leave their face as evidence—to perpetrate a fraud, the fraudster may need to leave a record of their face, leaving them easily identifiable. Face biometrics offer built-in deterrents to fraudulent activity.

Public Key Infrastructure (PKI) and digital signatures may help establish trust in the digital world. Electronic commerce legislation in North America and Europe was established around the year 2000. This legislation recognizes digital signatures as legally binding as "ink on paper" for the purposes of existing legislation that stipulates the requirement for ink signatures.

However PKI and digital signatures are primarily based on passwords, which can be insecure, and complex encryption mathematics that may be difficult for most people to comprehend. As a consequence PKI and digital signatures are based on "blind" trust. In other words, there is no way for the average consumer to replicate or even see the underlying methods that form the basis of the trust.

Secure Socket Layer (SSL) and Transport Layer Security (TLS) derivatives are used to authenticate web servers to a browser, however, for authenticating a user to the web server, the use of PKI either for secure communication or for transaction processing is costly. The benefits of PKI are significant, but to be successful it requires an efficient and cost effective solution.

SUMMARY

In an aspect, there is provided an encryption/decryption system for user authentication and document authentication using face biometrics. The system has a processor configured to: receive one or more challenge images for authentication and one or more digital assets to be digitally signed upon successful authentication of the one or more challenge images; verify that the challenge images were generated by capturing images of a live person; generate a plurality of challenge facial signatures by applying face detection operations to the one or more challenge images to identify one or more candidate face regions; create a challenge profile by linking together the plurality of generated challenge facial signature values; authenticate the challenge profile by applying face recognition operations to compare the linked challenge facial signatures to stored or pre-registered profile facial signatures and compute a similarity metric within a similarity threshold; retrieve one or more encryption keys when the challenge profile successfully authenticates, the one or more encryption keys being linked to the stored or pre-registered profile facial signature values; compile a signing package of at least one of: a digital image, the one or more challenge images, and the one or more digital assets; compile a package of digitally signed assets containing the signing package and the one or more digital assets or a hash of the one or more digital assets; digitally sign the package of digitally signed assets using the one or more of the retrieved encryption keys; transmit the package of digitally signed assets; and store at least one of the one or more challenge images, the challenge profile, the retrieved one or more encryption keys, the digital image, the one or more digital assets or the digitally signed package of digitally signed assets in at least one secure storage to provide electronic evidence of the activity. The signing package or the one or more digital assets can include an electronic signature. The signing package and the use of the key provide electronic evidence to verify or authenticate the electronic signature and that is was made by a registered or authenticated user.

In some embodiments, the processor is further configured to digitally sign the signing package using one or more of the retrieved encryption keys;

In some embodiments, the processor is further configured to verify that the challenge images were generated by capturing images of the live person by providing an electronic prompt to request the person to perform a sequence of one or more position requests, each position request defined by a change in pitch and yaw; trigger an image capture device to capture a sequence images of the person performing the sequence of one or more position requests, the sequence images capturing pitch and yaw movements of the person; generate a series of face signatures for the sequence of images of the user performing the sequence of the one or more position requests; compare the generated series of face signatures to stored face signatures corresponding to the requested sequence of the one or more position requests; and authenticate the person as being the live person as a first authentication step.

In some embodiments, the processor is further configured to apply face recognition operations to trigger the image capture device to capture at least one additional image of a person; verify the identity of the user as being an authorized user based on the at least one additional image of the user as a second authentication step; and store the at least one additional image of the person in a data storage as an audit trail.

In some embodiments, the face detection operations comprise illumination correction operations on the one or more challenge images to train the processor to eliminate shadows, glares or other lighting issues.

In some embodiments, a facial signature is a set of values that uniquely identifies a face relative to other faces.

In some embodiments, face detection operations comprise pose correction operations on the one or more challenge images.

In some embodiments, the pose correction operation comprise generating a plurality of facial landmarks using the candidate face regions from the face detection operations, each facial landmark being values that represent unique elements of a face, the plurality of landmark values being unique and specific to a user.

In some embodiments, the plurality of facial landmarks comprise 77 or 68 points of a face.

In some embodiments, the plurality of facial landmarks are used by the processor to detect the orientation of the face.

In some embodiments, the digital image of the signing package includes one or more of an image of an identification card, a thumbnail image of the one or more digital assets, and a thumbnail image of one of the challenge images.

In some embodiments, the signing package is a separate electronic document page that can be added to the one or more digital assets to compile the package of digitally signed assets.

In some embodiments, the signing package includes a thumbnail image of one of the challenge images embedded on an image of the one or more digital assets or the hash of the one or more digital assets.

In some embodiments, the processor is further configured to: create a registered profile by storing the challenge profile in a secure storage; create one or more registered encryption keys by storing the one or more encryption keys linked to the challenge profile in the secure storage; and create one or more registered assets by storing the one or more challenge images and one or more of the digital assets in the secure storage.

In some embodiments, the similarity metric is functional to determine whether the challenge image contains an image of a human face by comparing one or more of the challenge facial signatures comprising the challenge profile to one or more sets of the stored profiles containing facial signatures corresponding to pre-registered facial signatures corresponding to true human faces.

In some embodiments, the system has an image capture device configured to detect a user within a field of view of a camera; and the processor is further configured to: provide an electronic prompt to request the user to perform a sequence of one or more position requests, each position request defined by a change in pitch and yaw; trigger the image capture device to capture a sequence of images of the user performing the sequence of one or more position requests, the sequence images capturing pitch and yaw movements of the user; and store the sequence of images of the user performing the sequence of one or more position requests in memory as one or more challenge images.

In some embodiments, the processor further configured to: provide a second electronic prompt to request the user to present at least one physical document to the image capture device; trigger the image capture device to capture at least one image of the at least one physical document; and store the at least one image of the at least one physical document in memory as one or more challenge images.

In some embodiments, the at least one image of the at least one physical document is the digital image.

In some embodiments, the processor further configured to: communicate one or more digitally signed data files over a data network if the challenge profile is successfully authenticated, the one or more digitally signed data files signed using the key.

In some embodiments, the processor further configured to: generate a notification message indicating whether or not the challenge profile was successfully authenticated; and communicate the notification message and one or more of the challenge images to the enrolled user.

In some embodiments, generating the challenge profile further includes: an eye-detection routine operable to: analyze the one or more challenge images to detect one or more eye-feature values; and store the one or more eye-feature values in the challenge profile.

In some embodiments, the eye-detection routine further comprises: enhancing detection of the one or more eye-feature values by reducing the size of one or more face candidate regions within the one or more challenge images using Haar Cascades, thereby creating one or more face candidate region transformations; detecting a second plurality of challenge facial signatures by applying at least one modified Stasm process; and produce an eye-feature detection confidence score by analyzing the second plurality of challenge facial signatures against a set of pre-programmed facial landmark values.

In some embodiments, the image pre-processing step further comprises: correcting the pose of the face captured during registration or authentication in a challenge image to be re-oriented to a frontal position.

In some embodiments, an image pre-processing step comprises: correcting the face captured during registration or authentication in a Challenge image to eliminate or reduce noise caused by illumination.

In some embodiments, the processor is configured for analyzing the one or more features of the at least one pose correction operations by: extracting at least one first feature vector value corresponding to at least one component of at least one pose transformation; calculating an average first feature vector value by averaging each of the at least one first feature vector values; calculating a normalized first feature vector value by subtracting the average first feature vector value from each of the at least one first feature vector values; calculating at least one first feature eigenvector value by storing the difference between the average first feature vector value and each of the at least one first feature vector values; and extracting at least one first feature principal component by determining which of the at least one first feature eigenvector values exceeds a pre-programmed threshold.

In some embodiments, the processor is configured for generating the biometric profile further by: generating a second plurality of challenge facial signatures by applying one or more texture based analysis routines to the one or more challenge images; and integrating the second plurality of challenge facial signatures into the plurality of challenge facial signatures.

In some embodiments, the texture based analysis routine includes: determining the likely scale of the one or more challenge images by scaling the one or more challenge images up or down to various sizes according to a pre-programmed instruction set to create one or more scaled image transformations and by analyzing the one or more scaled image transformations in the image pre-processing routine; determining the likelihood that one or more sub-optimally oriented faces is depicted within the one or more challenge images by manipulating the one or more challenge images according to the pre-programmed instruction set in order to create one or more re-oriented image transformations skewed to one or more angles, and by analyzing the one or more scaled image transformations in the image pre-processing routine; and determining the likelihood that one or more edge-positioned faces is depicted at or near the edge of the frame of the one or more challenge images by injecting one or more white pixels to one or more sides of the one or more challenge images in order to create one or more padded image transformations, and by analyzing the one or more padded image transformations in the image pre-processing routine.

In some embodiments, the illumination correction operations comprise: creating a multitude of transformations of the challenge image, each emphasizing one or more components of the image and de-emphasizing others, using a Principal Component Analysis (PCA) procedure which includes orthogonal transformation.

In some embodiments, the similarity metric is generated based on at least one previously authenticated challenge profile.

In some embodiments, the similarity metric is generated by connecting to at least one database containing a plurality of digital images depicting, and pre-associated with, one or more users.

In another aspect, there is provided a method for user authentication and document authentication using encryption/decryption and face biometrics. The method involves starting an authentication session; receiving one or more challenge images for authentication and one or more digital assets to be digitally signed upon successful authentication of the one or more challenge images; generating a plurality of challenge facial signatures by applying one or more face detection operations to the one or more challenge images in order to create one or more image transformations to identify one or more candidate face regions; creating a challenge profile by linking together two or more of the plurality of challenge facial signature values; authenticating the challenge profile by applying face recognition operations to compare the linked challenge facial signatures to stored or pre-registered profile facial signatures and compute a similarity metric within a similarity threshold; retrieving one or more encryption keys if the challenge profile is successfully authenticated, the one or more encryption keys being linked to the stored or pre-registered profile facial signature values; compiling a signing package of at least one of: a digital image, the one or more challenge images, and the one or more digital assets; digitally signing the signing package using one or more of the retrieved encryption keys if the challenge profile is successfully authenticated; compiling a package of digitally signed assets containing the signing package and the one or more digital assets or a hash of the one or more digital assets; digitally signing the package of digitally signed assets using the one or more of the retrieved encryption keys; and storing at least one of the one or more challenge images, the challenge profile, the retrieved one or more encryption keys, the digital image, the one or more digital assets or the digitally signed package of digitally signed assets in at least one secure storage.

In some embodiments, generating the challenge profile comprises: generating a second plurality of challenge facial signatures by applying one or more texture based analysis routines to the one or more challenge images; and integrating the second plurality of challenge facial signatures into the plurality of challenge facial signatures.

In some embodiments, the texture based analysis routine comprises: determining the likely scale of the one or more challenge images by scaling the one or more challenge images up or down to various sizes according to a pre-programmed instruction set to create one or more scaled image transformations and by analyzing the one or more scaled image transformations in the image pre-processing routine; determining the likelihood that one or more sub-optimally oriented faces is depicted within the one or more challenge images by manipulating the one or more challenge images according to the pre-programmed instruction set in order to create one or more re-oriented image transformations skewed to one or more angles, and by analyzing the one or more scaled image transformations in the image pre-processing routine; and determining the likelihood that one or more edge-positioned faces is depicted at or near the edge of the frame of the one or more challenge images by injecting one or more white pixels to one or more sides of the one or more challenge images in order to create one or more padded image transformations, and by analyzing the one or more padded image transformations in an image pre-processing routine.

In some embodiments, the method further involves implementing on or more illumination correction operations that involve: creating a multitude of transformations of the challenge image, each emphasizing one or more components of the image and de-emphasizing other components of the image, using a Principal Component Analysis (PCA) procedure which includes orthogonal transformation.

In some embodiments, the similarity metric comprises at least one previously authenticated challenge profile.

In some embodiments, the similarity metric comprises connecting to at least one database containing a plurality of digital images depicting, and pre-associated with, one or more users.

In some embodiments, the method has one or more pose correction operations that involve: correcting the pose of a face captured during registration or authentication in a challenge image to be re-oriented to a frontal position.

In some embodiments, the method has one or more pose correction operations that involve: extracting at least one first feature vector value corresponding to at least one component of the at least one pose transformation; calculating an average first feature vector value by averaging each of the at least one first feature vector values; calculating a normalized first feature vector value by subtracting the average first feature vector value from each of the at least one first feature vector values; calculating at least one first feature eigenvector value by storing the difference between the average first feature vector value and each of the at least one first feature vector values; and extracting at least one first feature principal component by determining which of the at least one first feature eigenvector values exceeds a pre-programmed threshold.

In another aspect, there is provided an encryption/decryption system for user authentication and document authentication using face biometrics, the system comprising: a processor configured to: receive one or more challenge images for authentication and one or more digital assets to be digitally signed upon successful authentication of the one or more challenge images; generate a plurality of challenge facial signature values by applying face detection operations to the one or more challenge images to identify one or more candidate face regions; create a challenge profile by linking together the plurality of generated challenge facial signature values; authenticate the challenge profile by applying face recognition operations to compare the linked challenge facial signature values to stored or pre-registered profile facial signature values and compute a similarity metric within a similarity threshold; retrieve one or more encryption keys when the challenge profile successfully authenticates, the one or more encryption keys being linked to the stored or pre-registered profile facial signature values; digitally sign a signing package of at least one of: a digital image, the one or more challenge images, and the one or more digital assets using one or more of the retrieved encryption keys; compile a package of digitally signed assets containing the signing package and the one or more digital assets or a hash of the one or more digital assets; digitally sign the package of digitally signed assets using the one or more of the retrieved encryption keys; transmit the package of digitally signed assets; and store at least one of the one or more challenge images, the challenge profile, the retrieved one or more encryption keys, the digital image, the one or more digital assets or the digitally signed package of digitally signed assets in at least one secure storage to provide electronic evidence of the activity.

DESCRIPTION OF THE FIGURES

In the figures.

DETAILED DESCRIPTION

Embodiments described herein provide a system and method that generates various electronic indicia for trust in terms of the authentication of the person, their credentials and their associated document.

Figure 1:
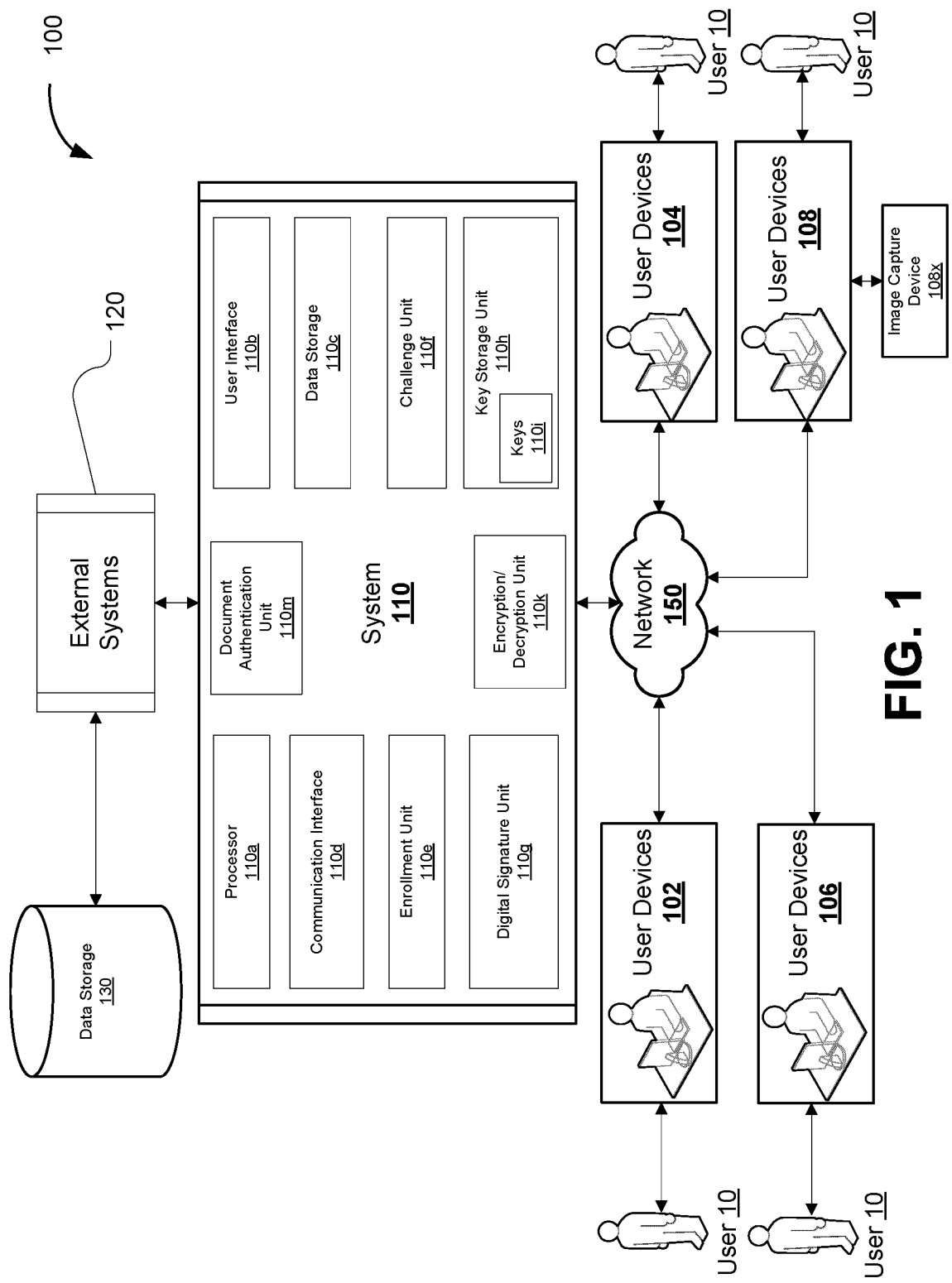
FIG. 1 is a block diagram of the components of a system for authentication according to some embodiments.

Referring now to FIG. 1 there is provided an example authentication system 110 that includes an authentication system 110 to authenticate users using face signatures and digitally sign electronic items using keys linked to the users. The system 110 also generates a signing package or page to add to the digitally signed electronic items to provide electronic authentication evidence, for example. Embodiments described herein may provide authentication system 110 configured to implement encryption/decryption for user authentication and document authentication using face biometrics and face signatures. The authentication system 110 can have a key storage unit 110h for storing a plurality of keys 110i. The system can have a challenge unit 110f for determining whether a prospective user of a key in the plurality of keys is the associated user of the key. The authentication system 110 can have an encryption/decryption unit 110k for encrypting and decrypting data using the plurality of keys when the challenge unit 110f authenticates the user 10 at user device 102-108. The authentication system 110 can have a document authentication unit 110m that authenticates the user for access to their plurality of keys to digitally sign a document and display the users face used to authenticate access to their plurality of keys in or associated with the document acting as a witness to the signing of the document. The signing package or the one or more digital assets can include an electronic signature by the user or witness. The signing package and the use of the key provide electronic evidence to verify or authenticate the electronic signature and that is was made by a registered or authenticated user.

For simplicity only one authentication system 110 is shown but there may be multiple authentication system 110 operable by user devices 102-108 to access remote network resources and exchange data. The authentication system 110 may be the same or different types of devices. The authentication system 110 may contain at least one processor 110a, at least one user interface 110b, a data storage device 110c (including volatile memory or non-volatile memory or other data storage elements or a combination thereof), and at least one communication interface 110d. The authentication system 110 components may be connected in various ways including directly coupled, indirectly coupled via a network, and distributed over a wide geographic area and connected via a network (which may be referred to as "cloud computing").

Authentication system 110 connects or couples to user devices 102-108 operable by different users of the authentication system 110. User devices 102-108 may include an image capture device to capture images of faces of users. User devices 102-108 may connect to the authentication system 110 via a network 150, which may be a local area network (LAN), wide area network (WAN), the Internet or any other communicative data network. Authentication system 110 may also connect to one or more external systems 120, which may provide images, documents, and other components or functionality to authentication system 110. For example, external systems 120 may include a connection to an external database, or an image capture device 108x (e.g., a still image capture device or a digital image capture device) operable to capture images or videos and communicate them to authentication system 110 for analysis. In some embodiments, external systems 120 may provide connection to external data storages 130 of images and information associated with one or more persons (e.g., external data storage 130 may be a Department of Motor Vehicles database containing driver's license images and identity information). External data storage 130 may allow the system 110 to better authenticate the identity of user(s) by performing the systems and methods described herein upon images in the external data storage 130 as well as captured or received images of the user to be authenticated.

The system 110 has a processor configured to receive one or more challenge images for authentication and one or more digital assets to be digitally signed upon successful authentication of the one or more challenge images. The one or more digital assets can include an electronic signature. A signing package can be appended to the one or more digital assets to provide electronic evidence to verify or authenticate the electronic signature and that is was made by a registered or authenticated user.

The system 110 is configured to verify that the challenge images were generated by capturing images of a live person. The system 110 is configured to generate a plurality of challenge facial signatures by applying face detection operations to the one or more challenge images to identify one or more candidate face regions. A face signature is a set of values that uniquely identifies a face relative to other human faces. The system 110 is configured to create a challenge profile by linking together the plurality of generated challenge facial signature values. The system 110 is configured to authenticate the challenge profile by applying face recognition operations to compare the linked challenge facial signatures to stored or pre-registered profile facial signatures and compute a similarity metric within a similarity threshold. The system 110 is configured to retrieve one or more encryption keys when the challenge profile successfully authenticates, the one or more encryption keys being linked to the stored or pre-registered profile facial signature values. The system 110 is configured to compile a signing package of at least one of: a digital image, the one or more challenge images, and the one or more digital assets. The system 110 is configured to compile a package of digitally signed assets containing the signing package and the one or more digital assets or a hash of the one or more digital assets. The system 110 is configured to digitally sign the package of digitally signed assets using the one or more of the retrieved encryption keys; transmit the package of digitally signed assets. The system 110 is configured to store at least one of the one or more challenge images, the challenge profile, the retrieved one or more encryption keys, the digital image, the one or more digital assets or the digitally signed package of digitally signed assets in at least one secure storage to provide electronic evidence of the activity. The signing package or the one or more digital assets can include an electronic signature. The signing package and the use of the key provide electronic evidence to verify or authenticate the electronic signature and that is was made by a registered or authenticated user.

In some embodiments, authentication system 110 implements a method for authenticating the sender of an electronic document, authenticating the sender's photo identification credential, and authenticating the sender's document or transaction using face biometrics with standard digital signature technology. Embodiments described herein augment the reliability of the document or transaction that includes an electronic signature. For example, embodiments described herein may append and display a signing package that may include objects such as the image of the face of the sender that was used to authenticate sender/creator of the document; the credentials of the sender. The signing package may be used for authenticating all digitally signed components either separately or in combination in order to prove what was electronically signed by whom. The signing package and the document or transaction that includes an electronic signature can be compiled to create a package of digitally signed assets, and the package can be signed or encrypted using a private key linked to the authenticated user. That is, upon authentication a key linked to the authenticated user is returned in order to sign or encrypt the package.

In some embodiments, authentication system 110 may provide benefits of PKI and digital signatures and adds visibility and transparency in terms of the individual presence for digitally signing. In some embodiments, the present disclosure provides a simple to operate, easy to implement, and cost effective solution using the signing package and linking keys to registered users. Embodiments described herein may remove the need for a costly external PKI infrastructure since the individual, along with their government issued photo-ID, may assert evidence of their identity into the signing package or page without need for a third party certificate authority.

In some embodiments, authentication system 110 may bind one or more digital images of the user's face to their private key and implement user authentication by capturing image frames of the user's live face and comparing the captured image frames against the enrolled digital images of their face in order to release the private key for signing documents or electronic files.

In some embodiments, authentication system 110 may capture and/or authenticate an image of a user's photo-ID credentials (e.g., driver's license, passport) by authenticating the user's face, as presented to a camera or other imaging device, to the face in the photo visible on their credentials. Embodiments described herein may employ the user's private key, once released by the biometric authentication method, to digitally sign the user credentials, ideally in accordance with a standard such as PKCS #1 RSA Cryptography Standard for Digital Signatures. The user credentials may be stored or maintained as part of a user record or profile.

In some embodiments, authentication system 110 may use (e.g., by use of a camera or other imaging device) the captured images of the live face that was used to authenticate the user and, using the user's private key, digitally sign the images such that it is digitally signed in accordance with PKCS #1 RSA Cryptography Standard for Digital Signature, by way of example. That Digital Signature may be linked to the individual, or the Organization that is providing the signing system.

In some embodiments, authentication system 110 may employ the user's private key, once released by the biometric authentication method, to digitally sign the document, message or transaction in accordance with a standard such as PKCS #1 RSA Cryptography Standard for Digital Signature. This may be in parallel or in addition to the proposed novel method.

In some embodiments, authentication system 110 may compile the digitally signed image, the digitally signed credentials, and the digitally signed document and their corresponding digital signatures into one or more documents which may be digitally signed in the manner described herein.

In some embodiments, authentication system 110 may provide visible attributes such that when the document is received and opened the document may display the document's contents along with visible attributes. The visible attributes may include the user's face, and/or the user's credential along with associated digital signatures.

Figure 4:
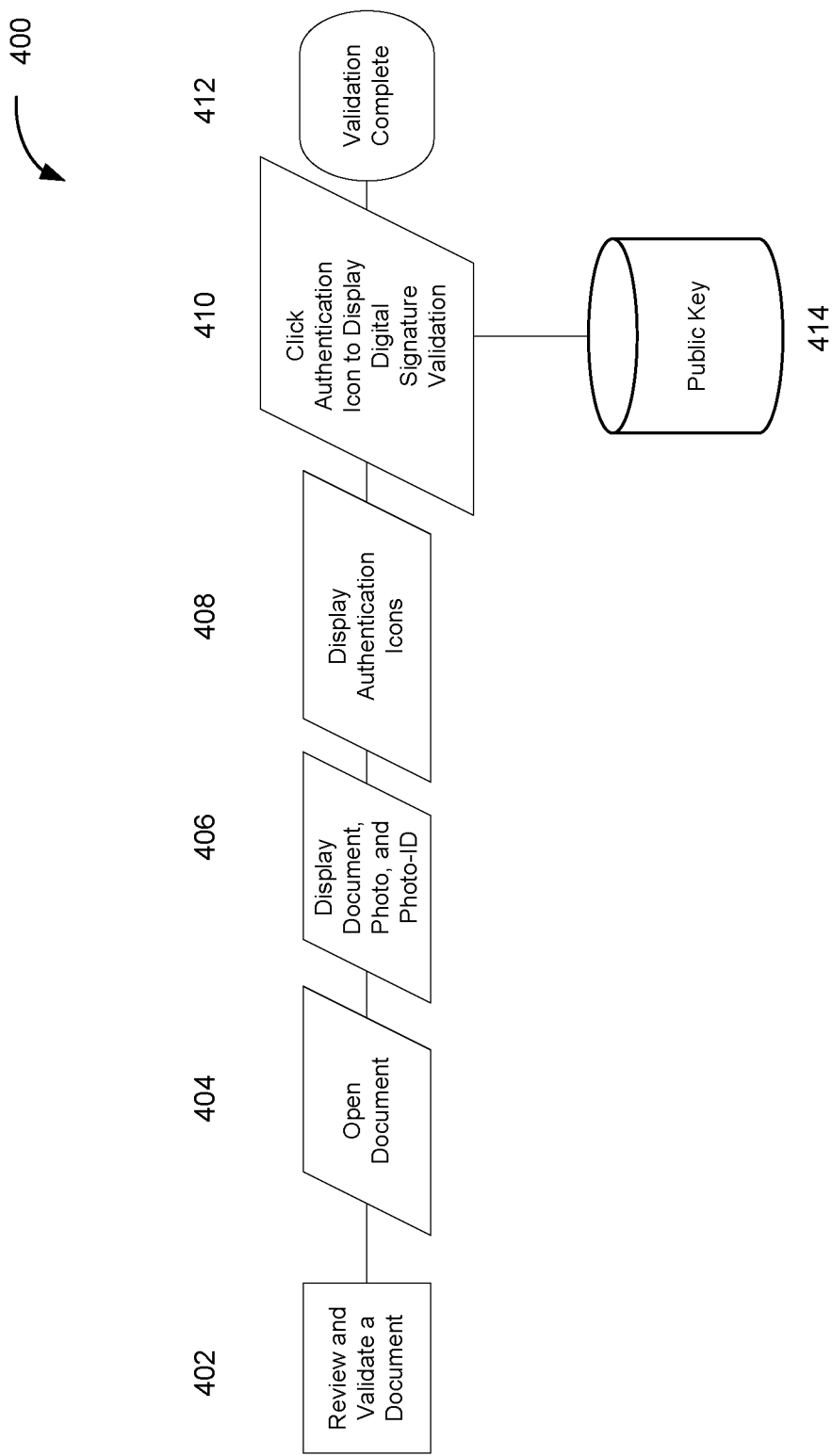
FIG. 4 is a block diagram outlining the process to review and authenticate document.

In some embodiments, authentication system 110 may independently verify and validate the signatures applied to a previously created document (see, for example, FIG. 4). The visible attributes may also be watermarked with graphics, text or numbers which may protect the visible attributes from copying. The watermark may also contain the actual digital signature or hash of the original document in order to maintain a permanent link between the visible attributes, the document or transaction, and the specific "signing" event undertaken by the user (see, for example, FIG. 5).

In some embodiments, authentication system 110 may provide a method for identifying a user associated with electronic document or transaction. The method may authenticate a document or transaction (in an electronic format) by: capturing an image of a face; verifying that the face captured in the image matches a pre-enrolled set of facial characteristics belonging to a specific user; releasing a private key if the face in the image matches the pre-enrolled set of facial characteristics belonging to the specific user; digitally signing the image and the document/transaction with the released private key; retrieving the pre-enrolled image; merging the captured image, the pre-enrolled image, the document and transaction data, and the corresponding digital signature created with the released private key; and sending the document/transaction to its intended recipient.

In some embodiments, authentication system 110 may use face signatures as a feature for comparing one digital image of a face to another digital image of a face. Face signatures may also be used when attempting to compare a digital image of a face to a set of digital images of known faces. The images of known faces may be used to generate one or more face signatures, for example. Some embodiments described herein may generate face signatures using a process with operations including, image capture, face detection, eye detection, and face recognition.

Image Capture:

According to some embodiments, authentication system 110 implements or triggers an image capture operation may include capturing one or more digital images from video sources. For example, such video sources may be, but are not limited to, a data feed from a live camera (e.g., a closed circuit television or "CCTV" camera), images stored as files in a data store, or one or more video files stored in a data store. Alternatively, embodiments may include one or more image or video capture devices operable to direct a user to perform one or more position requests and to capture and store images of said user performing said position requests for use in later steps. When the captured image to be processed is a video file, embodiments described herein may cause one or more static images to be produced from one or more video frames.

According to some embodiments, once digital images have been secured they may be used by authentication system 110 as challenge images; the various features in those images may be analyzed and compared to value(s) produced by digital images previously analyzed and stored in order to determine, according to a confidence or similarity threshold, whether the images depict the same person.

A similarity threshold is set, or more appropriately tuned, to the security and ease of use requirements of an application. Generally, a higher or larger threshold implies less security but greater ease of use. In face recognition terms, a higher threshold equates to higher false acceptance of the wrong person, and also equates to lower false rejection of the right person.

A similarity threshold is linked directly to the method for determining the likeness between two face signatures. In mathematical terms, the two faces being compared are represented by a vector of real numbers (e.g. face signatures) and a proxy for likeness is the distance between those two vectors (e.g. similarity metric). The distance can be measured in a myriad of ways. One method is to use the Euclidean distance method. This creates a single real number "likeness" score. Other methods can also be used to generate a likeness score including; weighting the vector elements; discarding outliers using statistical methods; or taking the average difference between vector elements.

Figure 12:
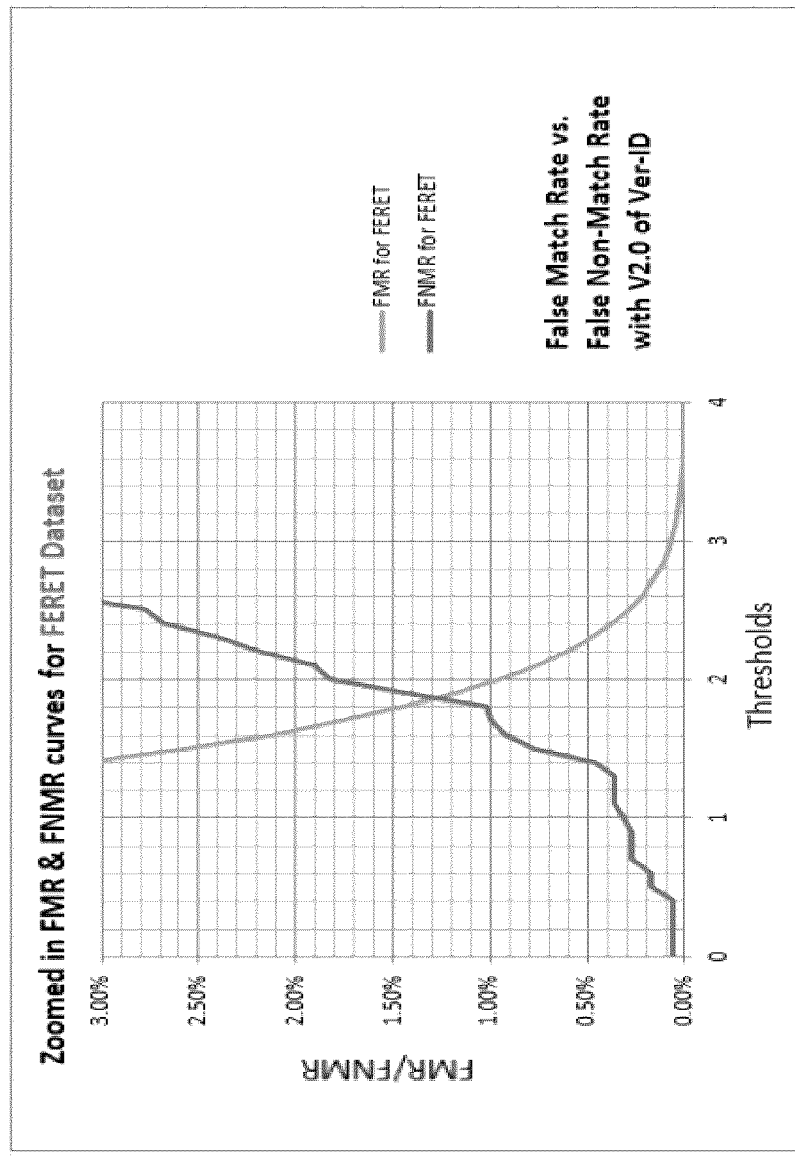
FIG. 12 is an example graph for threshold setting.

The similarly threshold can be determined by testing a particular face recognition method (including specific vector generation method and likeness score method) against a large set of faces. Both positive and negative tests are conducted to determine success or failure of face comparisons based on a wide range of thresholds. The threshold can be a specific distance setting below which the face is considered a match (success) and above which the face is considered a non-match (fail). Based on the results of those tests, a graph can be generated showing the false acceptance rate and false rejection rate for each threshold setting. FIG. 12 is an example graph for threshold setting. A threshold setting, based on an algorithm and face signature database, can be chosen to achieve a target application goal of 1 false acceptance in every 1000 attempts, and at the same time the correct person would only be rejected 4% of the time. This is an illustrative example.

Face Detection:

According to some embodiments, the systems and methods described herein may employ face detection operations to detect one or more faces or candidate face regions within an image. The systems and methods described herein may employ face recognition operations to recognize an identity or person associated with the face or candidate face region. Face detection, as used herein, may refer to one or more operations employed to detect depictions of one or more faces in images submitted as challenge images. Upon completion of face detection processes and/or routines, face detection operations may return one or more candidate face regions. A candidate face region delineates a region or portion of a challenge image that may depict or represent a face. Further, each candidate face region may be accompanied by a confidence score indicating a degree of confidence that a depiction of a face was successfully detected in each candidate face region.

An example face detection technique is a texture-based face detection technique. According to some embodiments, once a challenge image has been selected for face detection, authentication system 110 implements or triggers texture based analysis routines to scan pixels of the image in order to determine which, if any, regions within the image are likely to contain representations of faces. The accuracy of face detection steps of the present disclosure may be as high as 100% when attempting to detect faces from the images in the Face Recognition Technology (FERET) database created by the Defense Advanced Research Projects Agency (DARPA); accuracy may be as high as 97% when attempting to detect faces from the images in the PubFig 83 database provided by Columbia University, for example.

According to some embodiments, authentication system 110 implements or triggers texture based analysis routines that may be executed during the face detection operation which may include one or more of the following: Scaling image(s) up or down to various sizes in order to, for example, to detect faces depicted in different sizes, for example due to differing distances from the camera device, in order to highlight one or more possible face candidates; rotating the image to various angles in order to, for example, detect pixels depicting faces that may not have been directed squarely at the image capture device; and adding padding to one or more sides of the image (for example by introducing one or more white pixels to at least a portion of one side of an image) in order to, for example, better detect faces that may be positioned near the edge of the image frame. For example, the face detection routine can rotate the challenge image at incremental angles between a range of angles to identify candidate face regions. Each rotation and detection of a candidate face region within the rotated challenge image may be referred to as a rotation test. In some embodiments, a candidate face region may be confirmed when more than one consecutive rotation test returns a positive face candidate region for a challenge image.

Figure 10:
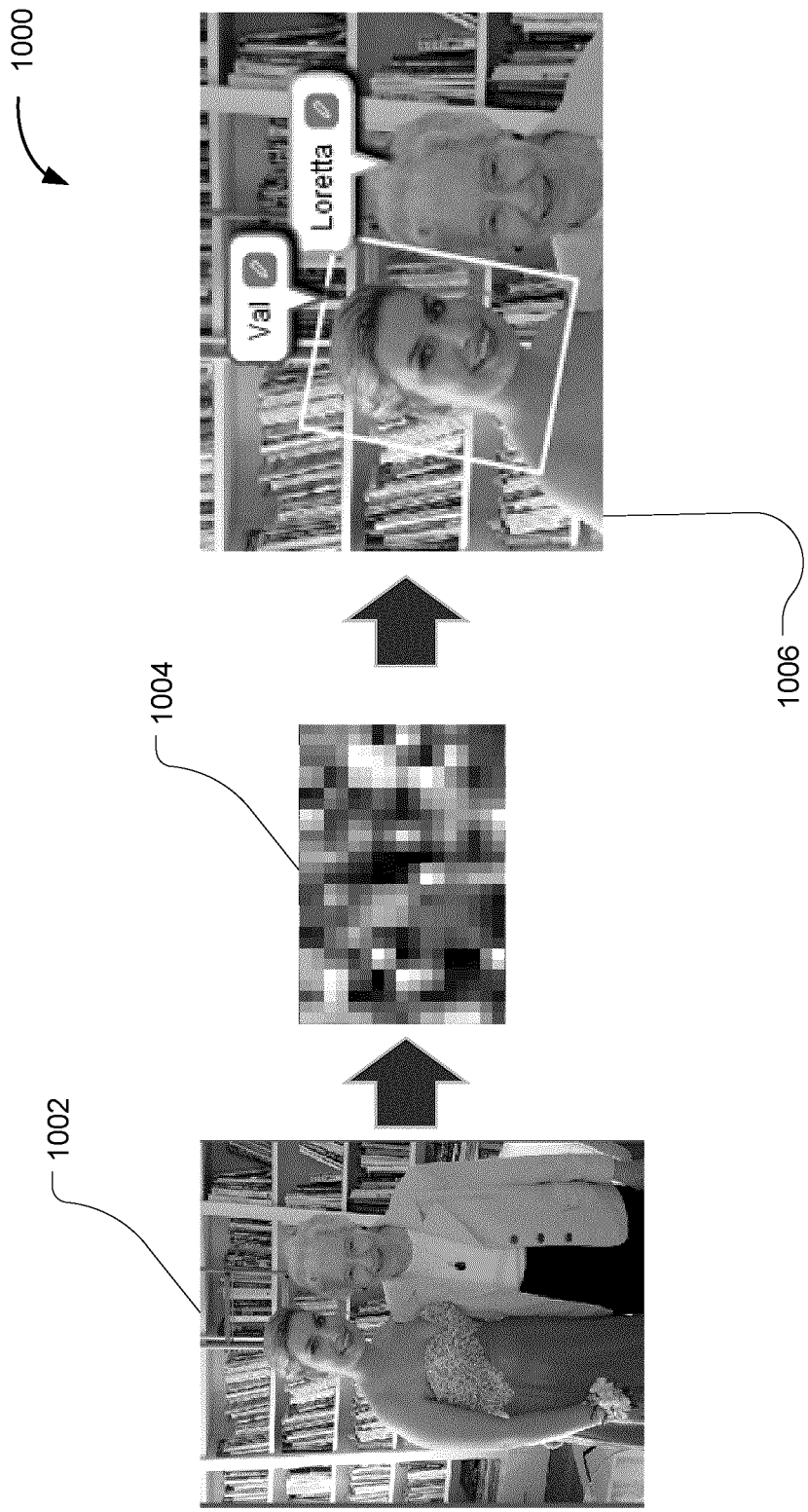
FIG. 10 illustrates a digital image undergoing face identification processes disclosed herein.

According to some embodiments, authentication system 110 implements or triggers texture based analysis routines that may be applied to images progressively from the top-left corner of the image in a downward and leftward fashion toward the bottom-right corner of the image. The texture based analysis routines may include a decision matrix developed by providing a multitude of images, some containing one or more faces and some not containing any faces, and labelling those faces as positive (at least one face) or negative (no faces in image). By analysis of the pixels in each group (positive and negative) of images, performing one or more transformations to each of the images (thereby creating "image transformations"), and analyzing the pixels that compose each image and each transformed image, the present disclosure may develop a decision tree based on patterns of pixels that may, when presented with a new image, return a "hit" (an indication that an image may contain a face) or a "no hit" (indicating that an image may not contain a face). FIG. 10 provides an example illustration of an input image 1002 undergoing one or more texture based analysis routines 1004 and producing candidate face regions 1006.

Figure 9A:
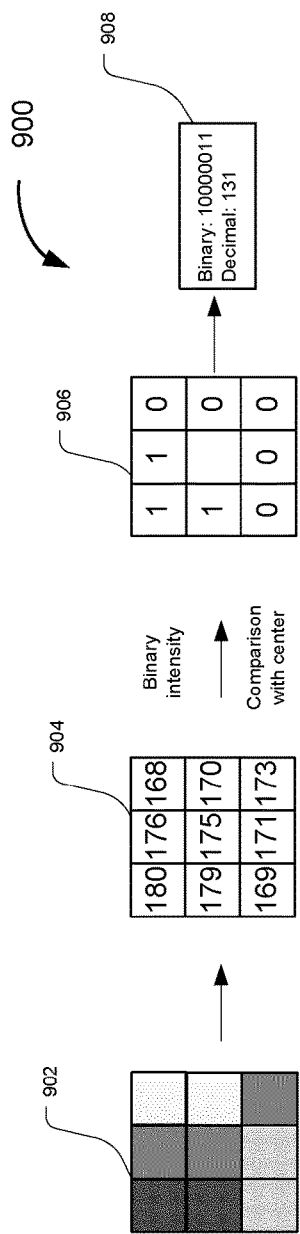
FIG. 9A illustrates features of methods of texture based image analysis according to some embodiments.

FIG. 9A provides an example illustration of a texture based analysis routine according to some embodiments. Grids 902 may each graphically represent a grouping of nine pixels in a digital image. Texture based analysis routines may progressively analyze each pixel in an image to detect patterns of pixels. This may be accomplished by isolating a grid of nine pixels (see 902); producing a numeric value for each pixel (see 904); thresholding the value of the eight pixels in the grid surrounding each given pixel to produce a binary value (see 906). The threshold may be defined as a certain value above or below the corresponding value in the pixel at the center of the grid. Texture based analysis routines may further produce a binary value derived from the thresholded values (see 908). The binary value produced may further correspond to one or more texture primitives representative of various patterns produced by groups of pixels.

Figure 9B:
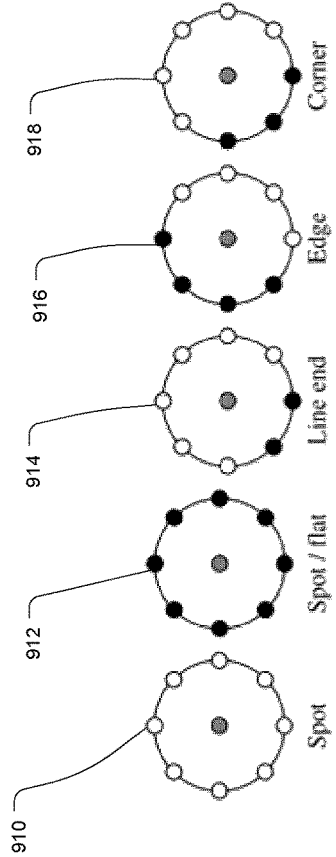
FIG. 9B provides an example illustration of texture primitives 910, 912, 914, 916, 918 utilized by some embodiments.

FIG. 9B provides an example illustration of texture primitives 910, 912, 914, 916, 918 utilized by some embodiments.

For example, as part of a Local Binary Patterns (LBP) embodiment, a center pixel surrounded by eight pixels that do not meet the threshold values may be represented by an example texture primitive 910. Another example texture primitives 914 may provide an illustration of a texture primitive generated by a pixel surrounded by six pixels that do not meet the pre-programmed threshold and two pixels (one directly beneath and one beneath and to the left) which do meet the threshold. This pattern may signify that the center pixel represents the end of a line. Texture primitives may serve to aid in the identification of patterns corresponding to facial features, when converted to binary values and analyzed in concert with texture primitives of each of the pixels in the image, and possibly other values.

According to some embodiments, a cascade of texture primitives may be used, which may contribute to increased detection performance while reducing computation overhead. Simpler classifiers may be used to reject the majority of texture primitives before more complex classifiers are used to discard false positives. Stages in the cascade may be employed by training texture primitives using an algorithm such as Gentle AdaBoost. A positive result from an earlier strong classifier may trigger the subsequent strong classifier which may be adjusted to achieve a higher positive detection rate than the previous classifier. A false result may immediately be rejected at any stage of cascade structure.

According to some embodiments, at the successful conclusion of a cascade decision tree through the complete processing of the texture primitives of an image, the algorithm will produce a candidate face region with a good confidence level (if a candidate face region is found).

According to some embodiments, authentication system 110 may store metrics such as a hit count which may refer to a tally of positive face detection results in the same set of pixels of an image (or the challenge profile containing the image and or one or more transformations of the image) and may also be described as a face similarity metric or score. For example, texture based analysis routines may detect a possible face in the pixels forming the upper right corner of an image and, after creating and analysing 10 transformations of the image, may detect possible faces in the pixels forming the upper right corner of 7 transformations. The hit count in such a scenario may be eight hits, one from the original image and 7 from each of the hits detected in the seven transformations. Hit counts of various regions of images may be tallied, and areas with lower hit counts may be designated as not likely to contain representations of face.

According to some embodiments, authentication system 110 may compare the total hit count to a similarity threshold. This similarity threshold may refer to a pre-determined ratio of hits to non-hits. The similarity threshold may be used to determine the likelihood that the original image that produced the transformations in the challenge profile depicts a human face, and/or the likelihood that said image depicts the same face as another image.

According to some embodiments, when the image(s) to be analyzed are colour images, authentication system 110 may implement or trigger a skin colour ratio routine in order to further develop face confidence value scores for various regions of the image. In comparison to the entire visible colour spectrum, the range of colours that are likely to form part of a human face may be quite narrow. Thus, the likelihood that a face may be depicted in a region of an image may increase where colours that commonly form part of human faces are detected within a region of an image also designated as likely to contain one or more representations of face(s). According to some embodiments, images may not be rejected solely based on colour analysis, but rather, such analysis may be used to increase or decrease confidence values.

According to some embodiments, face detection operations may generate a candidate face region that may be processed to generate a face signature. A face signature is a set of values that identifies properties of the face depicted in the candidate face region. Face signatures generated by processing candidate face regions depicting the face of the same individual may be similar. Accordingly, comparing face signatures provides a mechanism to authenticate an individual whose face is depicted in a candidate face region of a challenge image used to generate one of the face signatures.

Anti-Spoofing

According to some embodiments, authentication system 110 implements or triggers texture based analysis to determine whether the image containing a depiction of a face is an original image (i.e., an image produced when a human presents a face to an image sensor), or a reproduction of an original image (i.e., an image produced when an original image is presented to an image sensor). Reproductions of original images (e.g., printed photographs or video presented on a screen) may produce certain compositional patterns that may be detected by texture based analysis processes described herein. In the event an image submitted for face detection is detected as being a reproduction of an image, some embodiments may designate the image as not containing a face, but rather, containing a reproduction of a face; such images may be flagged as possible spoofing attempts.

As an example, where a still photograph is presented to an image capture device (instead of an actual face) in order to serve as a challenge image for face detection, some embodiments described herein may reject the presented image as not depicting an actual face (e.g. not depicting a face of a "live" person). Two-dimensional images, when analyzed for face detection may exhibit facial s values inconsistent with values produced by an actual face (e.g. three dimensional representation of the face). This may be when the presented image is not presented at an angle directly perpendicular to the image sensor of the image capture device. These inconsistent values may be produced due to the fact that features of an actual face may produce facial signature values that, when repositioned (e.g., when a face is turned to one side), produce changes in values corresponding to movement in 3-dimensional space, whereas facial signature values exhibited by 2-dimensional images may undergo changes corresponding only to movement in 2-dimensional space.

As another example, 2-dimensional video displays may produce images of faces by generating patterns of coloured pixels, each of said pixels forming part of a screen. Although such displays may exhibit different pixel densities and pixels may be of different sizes, this fundamental aspect of video displays may be constant. As a result, image capture devices that capture images of 2-dimensional video display(s) may produce images containing pixilation patterns consistent with the makeup of the 2-dimensional video display(s). Texture-based analysis processes described herein may detect such pixilation patterns. When such pixilation patterns are detected, some embodiments may designate images producing said patterns as not containing a face, but rather, containing a reproduction of a face; such images may be flagged as possible spoofing attempts.

Other illustrative examples of anti-spoofing techniques may include: detecting whether a face disappears from an authentication session, which may indicate someone raising or lowering a printed image or display device in front of the camera; detecting whether a presented face changes from that of one person to another during the same session; and, detecting significant variations in the detected face's distance from the camera during the same session.

Figure 8:
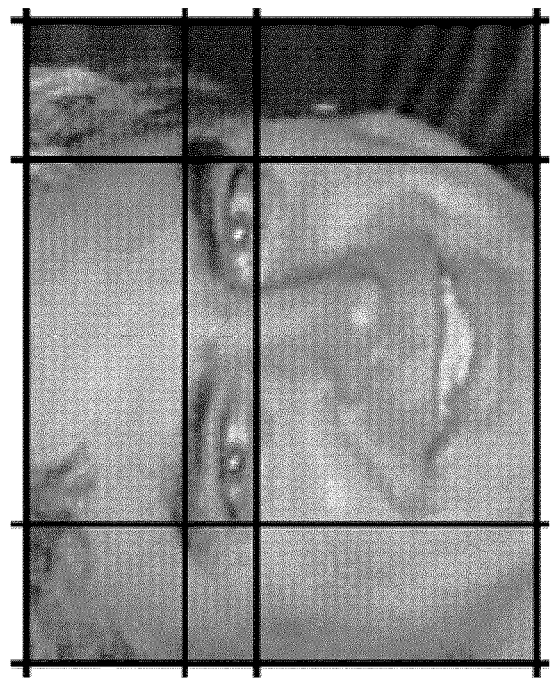
FIG. 8 illustrates a digital image of a face undergoing eye detection according to some embodiments.

Eye Detection:

According to some embodiments, authentication system 110 may generate face signatures by performing one or more eye detection operations. Eye detection may be part of a face detection operation, for example. An eye detection step may involve detecting pupil coordinates or other components of the eye. Detection of pupil coordinates may be accomplished, in part, by applying a modification of the Stasm software library for detection positions of facial features in still images. Stasm may function by reducing the size of face candidate regions of images (a transformation) in order to improve the function of an eye detection procedure using Haar Cascades. Some embodiments may apply modified Stasm processes to produce a confidence scoring system. According to some embodiments, Stasm may detect 77 facial landmark points that may be utilized for detection of additional facial features. Once detected, the additional facial features may be analyzed in order to produce additional facial signature values. FIG. 8 provides an example illustration of an image undergoing eye detection steps according to some embodiments. Eye tracking from frame to frame may also be used in an embodiment to differentiate between a static image and a real face in front of the camera.

Face Recognition

As stated above, according to some embodiments, the systems and methods described herein may employ face detection operations as well as face recognition operations. Face detection techniques may be employed to detect depictions of one or more faces in images. According to some embodiments, face detection operations may generate a candidate face region that may be processed to generate a face signature for use by face recognition operations. A face signature is a set of values that identifies properties of the face depicted in the candidate face region.

Face signatures generated by processing candidate face regions depicting the face of the same individual may be similar. Accordingly, face recognition can involve comparing face signatures to authenticate an individual whose face is depicted in a candidate face region of a challenge image used to generate one of the face signatures.

Face recognition techniques may function to determine the identity of the person depicted in the candidate face region resulting from face detection operations. The candidate face region is processed to generate the face signature. For example, face recognition can determine whether multiple images depict images of the same face and the identity linked to the face. Face recognition may involve a comparison of a face signature generated by processing a challenge image to stored face signatures associated with registered users, for example, to authenticate the identity of the individual depicted in the challenge image, for example.

For example, in some embodiments, face recognition techniques may measure a plurality of features (e.g., defined by face signature values) of a face depicted in a challenge image submitted for face recognition, according to the various systems and methods described herein. For example, feature measurements may be amalgamated to produce a face signature associated with the face depicted in the challenge image. Next, the face signature (e.g., the amalgamated plurality of feature measurements) may be compared to one or more previously generated face signatures, each containing another plurality of face feature measurements. This comparison may be used to produce a similarity metric representing the degree to which the measurements of features stored in the two face signatures match one another. In the event that the similarity metric produces a score above a similarity threshold (which may vary depending on several factors, for example, the quality of the challenge image(s)), the systems and methods described herein may successfully recognize the face depicted in the challenge image as being the same face represented by the second face signature. That is, the systems and methods described herein may authenticate an individual depicted in one or more challenge images if the score is above the similarity threshold. The similarity threshold may be updated using machine learning techniques.

According to some embodiments, authentication system 110 implements or triggers face recognition operations that may include one or more image pre-processing techniques or routines. For example, an image to be analyzed may be converted to greyscale (if a colour image), or may undergo histogram equalization (redistribution of colour or luminance intensity in order to modify image contrast), for example.

As stated above, according to some embodiments, the systems and methods described herein may employ face detection operations as well as face recognition operations. Face detection techniques may be employed to detect depictions of one or more faces in images. According to some embodiments, face detection operations may generate a candidate face region that may be processed to generate a face signature for use by face recognition operations. A face signature is a set of values that uniquely identifies a face relative to other human faces.

Different examples of method can be used by system 100 for generating a face signature. For example, a principal component analysis (PCA) method can be used to generate an array (vector) of real numbers that represent the unique elements of a face. The face signature may be the array of a transformation of the array, for example. The method can be trained by analyzing and processing thousands of sample images of faces. For example, consider an image of a "face" for this purpose as an array of pixels that represent a face. The location of this array is detected by a face detection method to identify the candidate face region. The pixels can be extracted from the image containing the face based on a rectangle or oval mask. The sample faces are used to create a master matrix formed from all sample faces. A new face that is part of a challenge set can be transformed through a PCA projection operation into an array of real numbers (e.g. face signature). The array represents the unique characteristics of that face and can be used to compare against other faces. Accordingly, the array may be used as a face signature.

System 100 is also operable to generate facial landmark values. System 100 is also operable to implement facial landmark methods that analyze a candidate face region to find key face landmarks may also be used to generate an array of real numbers that represent unique elements of a face and distinguish one face from another. Landmarks can be pixel coordinates within the candidate face region that map to specific features (e.g. eye, nose, mouth, chin). Some algorithms, Stasm for example, generate 77 facial landmarks (each landmark denoted by x,y coordinates relative to the input image). Another algorithm, DLIB, finds 68 landmarks. These are examples methods to generate facial landmarks. They are trained using supervised machine learning techniques. The landmarks found for a face can be used "as is" to define a face, or further operations may be performed on the landmarks such as normalizing the size of the face and then measuring the distances between all or some landmarks to provide a unique array of numbers that define a face. Landmark values can be used to determine orientation of the face in an image for example. There may be a landmark value for the right cheek and another landmark value for the left cheek as an example. The landmark values can be detected and used to determine if the face is turned to one side, for example.

Face signatures generated by processing candidate face regions depicting the face of the same individual should be similar. Accordingly, face recognition can involve comparing face signatures to authenticate an individual whose face is depicted in a candidate face region of a challenge image used to generate one of the face signatures. The system 100 may return a value as a result of comparing face signatures that can be compared to a threshold.

Face recognition techniques may function to determine the identity of the person depicted in the candidate face region resulting from face detection operations. The candidate face region is processed to generate the face signature. For example, face recognition can determine whether multiple images depict images of the same face and the identity linked to the face. Face recognition may involve a comparison of a face signature generated by processing a challenge image to stored face signatures associated with registered users, for example, to authenticate the identity of the individual depicted in the challenge image, for example.

Another technique related to anti-spoofing is by comparing face signatures from multiple poses in the challenge set or profile to pre-registered face signatures for corresponding poses. For example, a person is asked during registration to pose left, right, up and down in addition to a frontal pose. At each pose a facial signature is generated by system 100. The facial signature will be different for a 2D photo turned left, right, up and down when compared with a real facial signature (e.g. generated by a real person instead of a 2D photo) when turned to those poses. This method defeats a person holding up a photograph to try to authenticate as an imposter.

Facial landmarks can also be used to verify that the person has met the pose request. As an example, the triangle between the eye and nose landmarks can be used to calculate a pitch and yaw estimate for the face. This estimate can be used to verify that a person moved to the proper pose. It can also be used to eliminate pre-recorded video being used to spoof and impersonate because the poses can be asked in random order; if the user moves in the wrong direction based on the pitch and yaw estimates that authentication session can be discarded.

Other example embodiments may involve watermarking the image or document added to the signing package. Visible watermark techniques may be employed to display the document hash over key elements such as the face image or identification document image. Digital watermark techniques may also be used to embed the hash within the digital image (JPEG) in a non-visible way but with the ability to digitally verify.

Illumination Correction

According to some embodiments, authentication system 110 implements or triggers image pre-processing operations that may include illumination correction. Illumination correction may be achieved using a Principal Component Analysis (PCA) procedure that may use orthogonal transformation in order to create multiple transformations of an image, each emphasizing one or more components of the image and de-emphasizing other components specifically related to illumination in order to filter illumination affects from resulting eigenvectors. In some embodiments, illumination correction may be part of face detection operations. In some embodiments, illumination correction may be part of face recognition operations. For example, one or more face recognition processes may then be executed upon each transformation of the image in order to detect values or measurements corresponding to various facial features. In some embodiments, illumination correction may only be applied to images that have already undergone one or more warping techniques intended to produce images representing a frontal view of a face.

Figure 6:
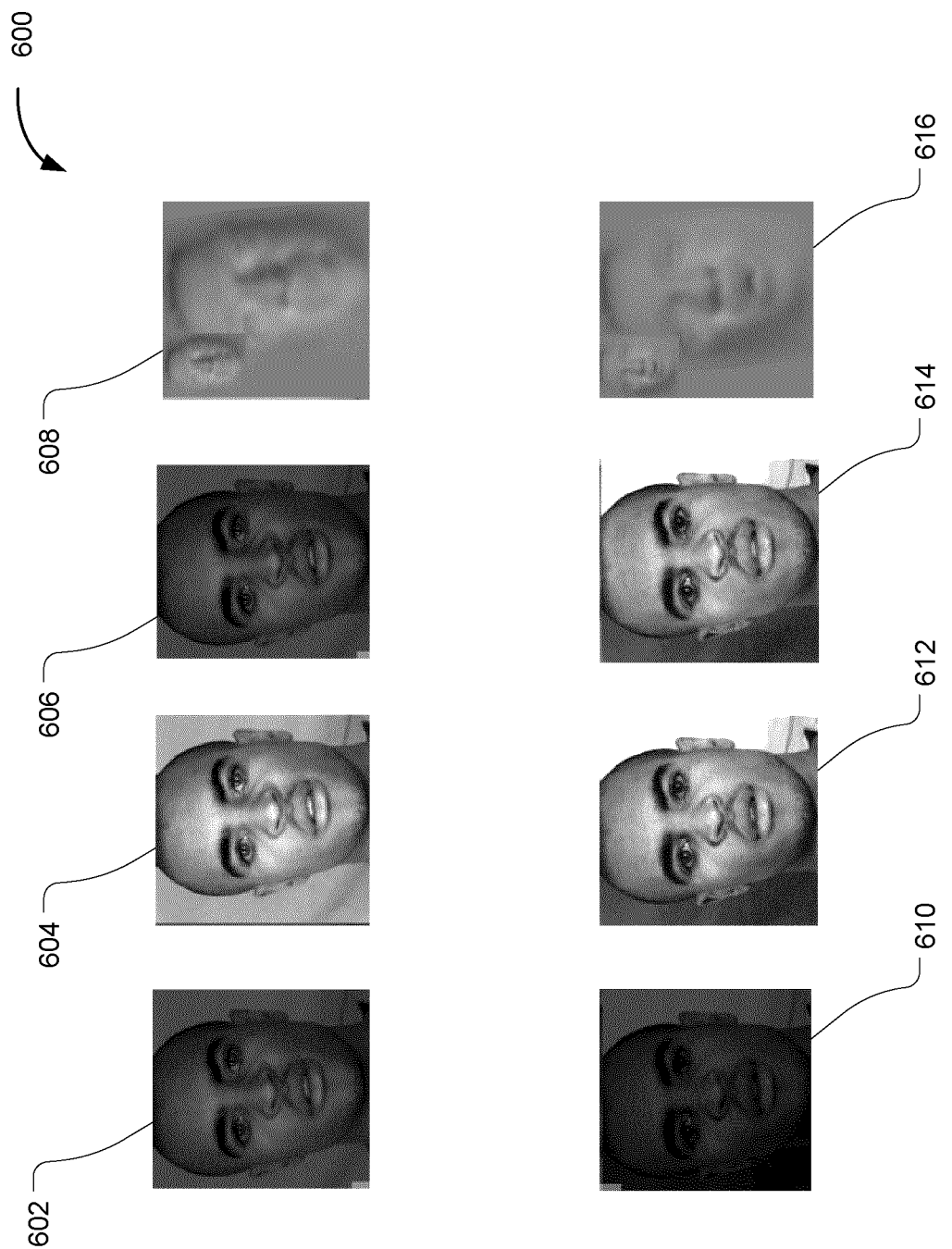
FIG. 6 illustrates a digital image of a face undergoing illumination correction according to some embodiments.

Turning to FIG. 6, an example illustration of an image undergoing multiple illumination processes as described above may be provided. Images 602-616 may represent transformations of an image submitted to the system described herein according to some embodiments. Each of the images 602-616 may represent a transformation according to one or more PCA procedures using orthogonal transformation and each transformation image 602-616 may emphasize one or more separate illumination components of the original image such that different facial features exhibited in the original image may be more accurately or easily detected and/or measured.

Accordingly, embodiments described herein may implement illumination or lighting correction on images. System 110 may implement a lighting correction assessment on the images with pose correction techniques used to warp a face warped to a standard frontal pose. System 110 may compute illumination correction using a PCA technique, for example. System 110 can use the computed illumination correction to filter the warped image. These techniques may be compounded. This is an illustrative example.

Pose Correction

According to some embodiments, authentication system 110 implements or triggers pose correction that may, at one or more points of the face recognition process, be applied to the image. Pose correction may refer to the detection of a multitude of facial landmark points (this may be 77 facial landmarks in some embodiments), and adjusting of the image, by one or more warping techniques, based on those facial landmarks in order to produce images representing an alternate view of the face (e.g., a frontal view of the face).

Figure 7:
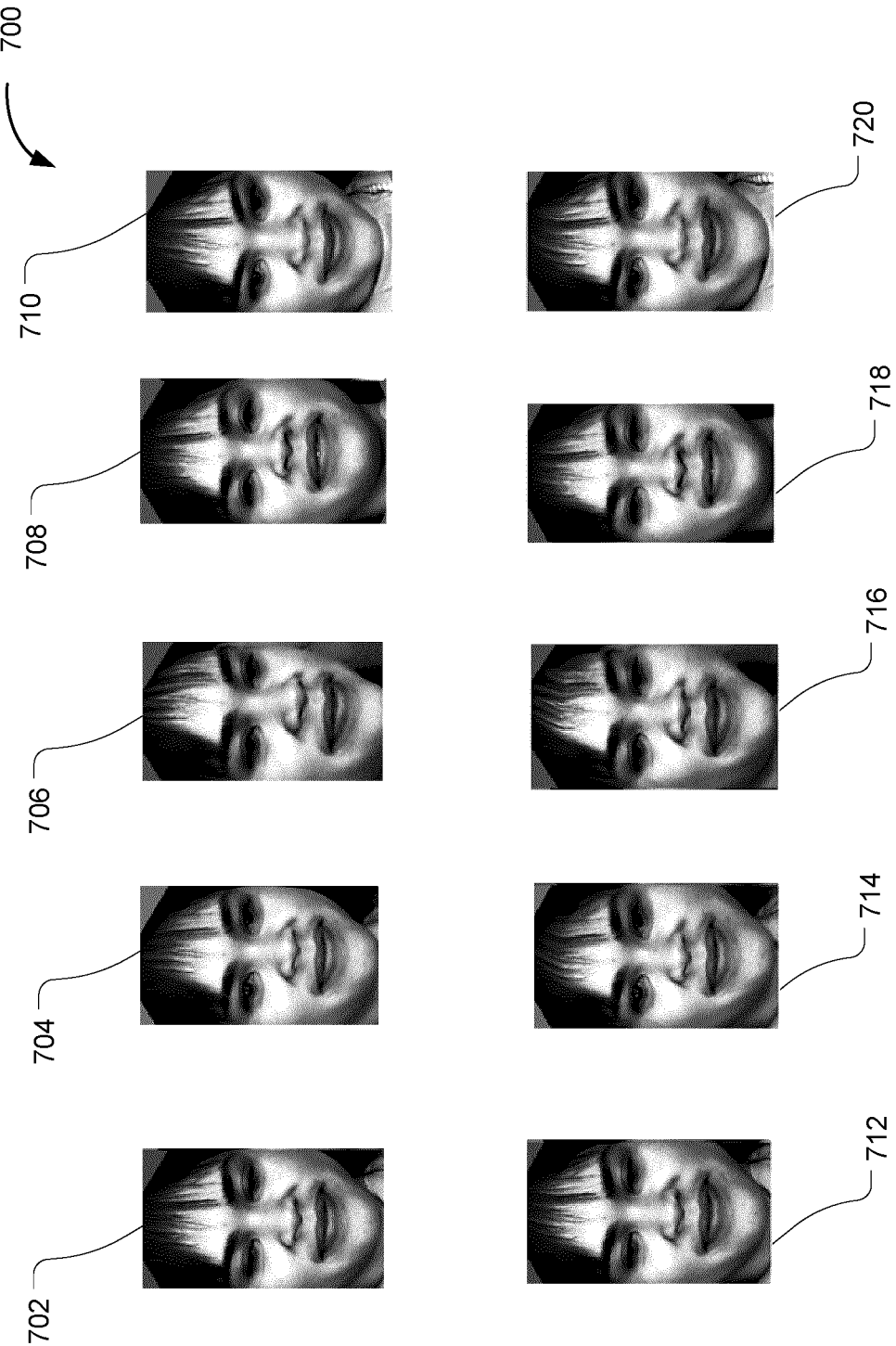
FIG. 7 illustrates a digital image of a face undergoing pose correction according to some embodiments.

Turning now to FIG. 7, an example illustration of an image undergoing multiple pose transformations according to the pose correction processes as described above may be provided. Transformed images 702-720 may represent transformations of an image submitted to the system described herein according to some embodiments. The original image may be analyzed according to processes described herein in order to identify a plurality of facial landmarks. Then, the image may undergo one or more processes, which may include one or more PCA techniques, to estimate where each of the plurality of facial landmarks is likely to appear when the face is presented to an image sensor in a different pose. These estimated positions may then be applied in order to transform (e.g., warp) the original image, thereby producing one or more transformed images 702-720. Features of each transformed image 702-720 may then be analyzed in order to add additional facial signature values to the face signature of the face represented in the original image.

According to some embodiments, facial signatures generated by a PCA method may contain an array of numerical values representing various features of the face depicted in an image. The number of values in the array may, in some embodiments, be approximately 200 values and may represent the differences in a specific face relative to the average face generated across a large training set of faces.

Face to Face:

According to some embodiments, where two images containing representations of two human faces are compared to one another, authentication system 110 implements or triggers calculation of a mathematical distance between the face signatures generated by the faces found in those images. For example, the Euclidian distance method may be used in order to generate a similarity ratio which may, according to a pre-programmed similarity threshold, be used to determine whether the human face represented in the images is deemed to be the same face. This may occur during face recognition operations to compare a face signature of a challenge image to a face signature of a known or registered user.

Face to Multiple Known Faces:

According to some embodiments, authentication system 110 implements or triggers a grouping of faces producing similarity values sufficient to be programmatically designated as likely representing the same face with one another into multiple clusters. Where a new image of a face is to be compared against a known face, in some embodiments, the mean of the face signature values of all photos in a relevant cluster will be used to determine whether the human face represented in the images in the cluster is likely represented in the new image. According to some embodiments, each element forming part of the facial signature may be scaled relative to its correlative values in each cluster image. This may correct for outlier values in specific images that may not accurately represent features of the face represented in the cluster images. This may occur during face recognition operations to compare a face signature of a challenge image to face signatures of known or registered users.

In some embodiments, where a new image is verified as depicting a human face, but does not produce a face signature with a high enough similarity value to be designated as representing a known face associated with a registered user profile, a new cluster may be formed containing solely that new image. Such a new cluster may be compared separately to known face signatures in with this method account for changes in appearance over time. In some embodiments, where a new cluster has been created, a new registered profile corresponding to said new cluster may be created as well.

Authentication:

According to some embodiments, where an image (e.g., a newly captured "challenge image") is determined to exhibit features corresponding to a face depicted in a database, authentication system 110 implements or triggers deemed authentication of the image. Upon successful authentication, the authentication system 110 may, for example, allow access to certain digital assets. An image (e.g., a newly captured "challenge image") is determined to exhibit features corresponding to a face depicted in a database when a comparison of a face signature generated using the challenge image to one or more face signatures linked to known people or registered users returns a score that is within a defined range or threshold.

In some embodiments, successful authentication may cause the authentication system 110 to provide access to one or more private encryption keys, data files stored in secure storage, or other encrypted digital assets. These digital assets and encryption keys may be used to create a digitally signed package of items that could not be created without successful authentication of the challenge image.

In some embodiments, a notification message may be delivered by authentication system 110 to the registered user upon each successful or unsuccessful authentication attempt. Such a notification message may contain, for example, the time and place of the authentication attempt, the outcome (success or failure) of the authentication attempt, the video, image, or sequence of images captured by, or submitted to, the system as challenge images to be authenticated against the registered profile, and other information as may be appropriate. In some embodiments, the data contained in the notification may also be stored by the system and associated with the registered profile as an audit trail.

Figure 2:
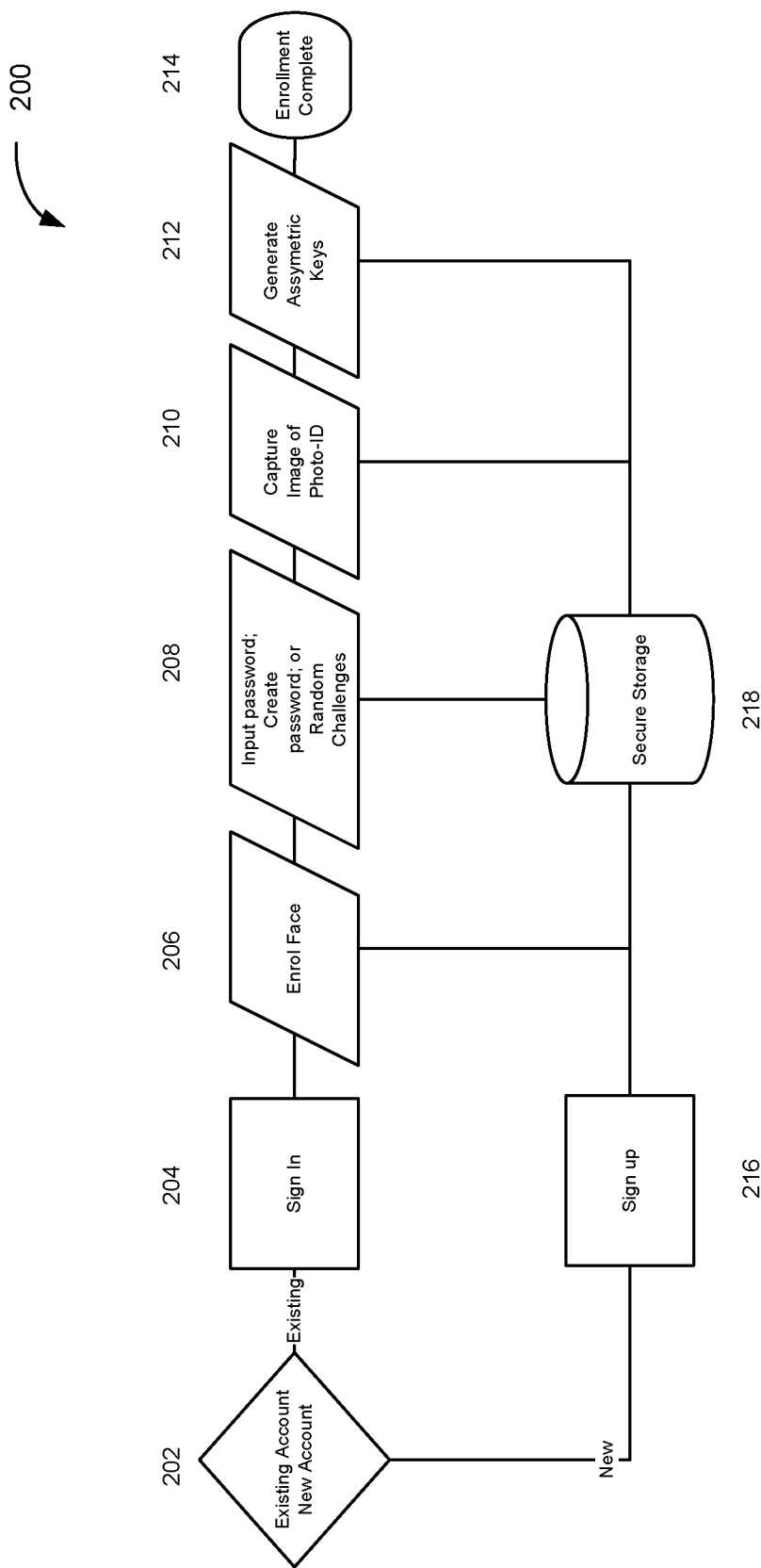
FIG. 2 is a block diagram outlining the process for enrolling in the authentication system.

Turning now to the figures, FIG. 2 provides an example method of enrolling a user into an authentication system 110 according to some embodiments of the present disclosure. To enroll, at step 202 an existing user may sign-in 204 using an existing authentication method (e.g., a password), or at 202 an unregistered user may register for face biometric authentication 216, thereby creating a registered profile.

At 206, the user may enroll their face by posing as instructed (e.g., by an electronic prompt displayed on a screen) and having their image captured by the enrollment service feature of the present solution. In some embodiments, the enrollment service may provide an electronic prompt directing the user to perform multiple position requests and may capture a sequence of images of the user's face as it conducts various pitch, yaw, and role movements relative to the image capture device.

At 206, the enrollment service may render the captured posed face images into face signatures and store such signatures in secure storage 218.

At step 208, the user may optionally enter or create a password, upgrade a password or provide answers to a number of random challenge questions, such passwords or answers may be stored in secure storage 218.

At step 210 the user may be prompted to present their photo-ID to a camera such that an image of their photo-ID may be captured by the solution of the present disclosure. Optionally the face in the captured photo-ID 210 may be authenticated against the enrolled faces or with the live face of the user or both. An asymmetric key pair is then generated at step 212, ideally in accordance with a standard such as public-key cryptography standards PKCS #12 Personal Information Exchange Syntax Standard and may be stored in the secure storage 218 on the user's device. The public key certificate (also known as a digital certificate or identity certificate) may be made available for public consumption. This may create a "self-signed" certificate or may support use of third-party vendors (e.g., VeriSign®, Entrust®, etc.) to create, authenticate and host the users public key certificate.

According to some embodiments, the example method of enrolling a user into an authentication described above may also include linking together one or more of the above-described components to create a registered user profile. For example, once an image has been rendered into one or more face signatures composed of face signature values, the signature, the password, the image of the photo-ID, and/or the public and private cryptography key may be linked (symbolically or otherwise) together by a computer system. Such a linked set of digital assets may be referred to herein as a registered user profile.

Figure 3:
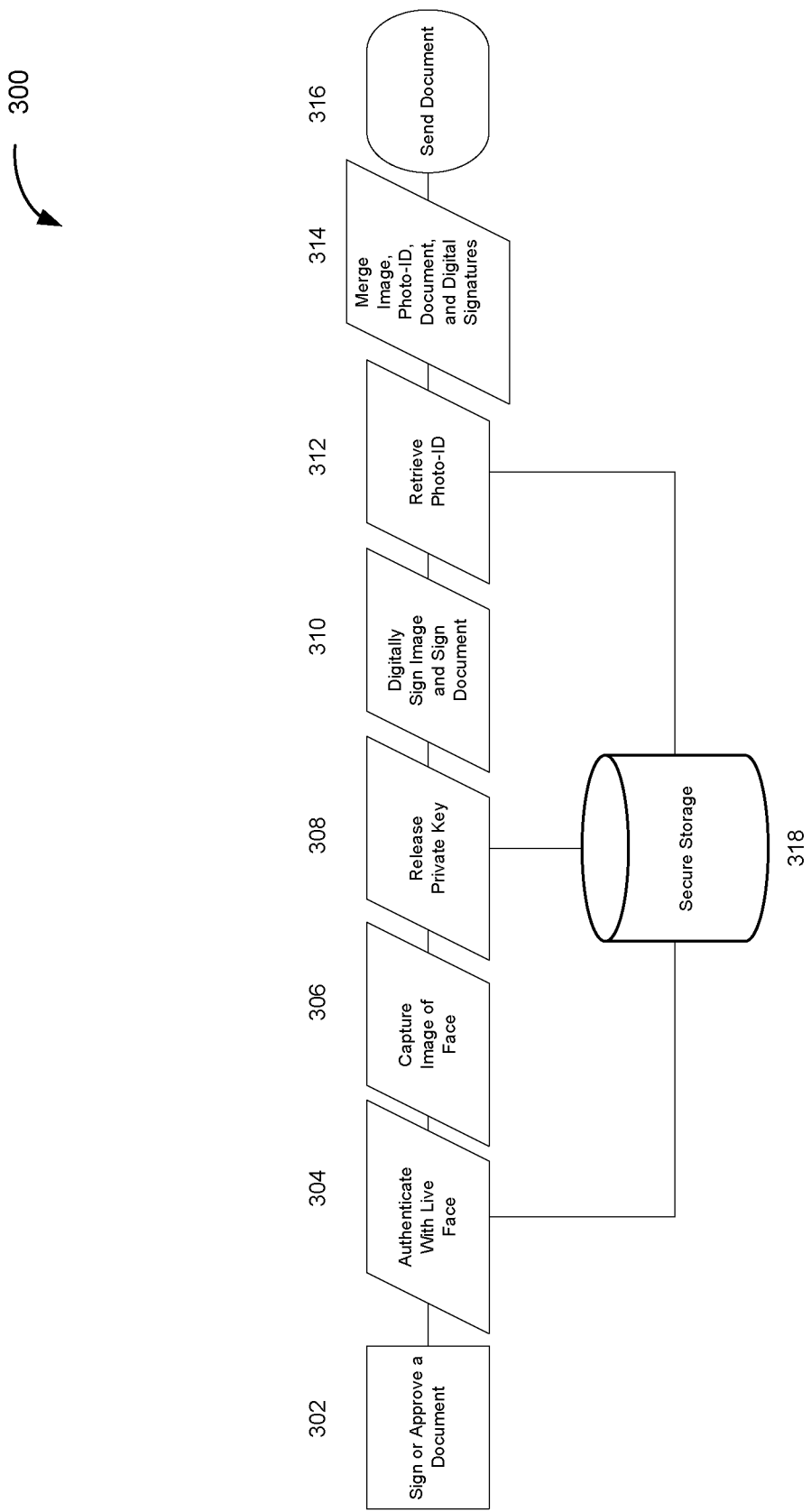
FIG. 3 is block diagrams outlining the process for authentication a user, their credentials and a document.

Turning to FIG. 3 there is provided an example method for implementing a user, credential, and document authentication system according to some aspects of the present disclosure. To authenticate a document a user may choose to sign or approve a document or transaction 302. The user may then present their face to a camera which may capture an image of their face for authentication. At step 304 an image may be taken of the user which may be compared to a pre-enrolled facial image corresponding to the user. At step 318, if the face is positively matched the authentication software of the present disclosure may release the user's private key from secure storage. The image taken for authentication may be saved and digitally signed using the user's private key, ideally in accordance with a standard such as public-key cryptography standard PKCS #1 RSA Cryptography Standard Digital Signature.

Further referring to FIG. 3, at step 318 the user's photo-ID credentials may be retrieved from secure storage and the captured face may be compared to the face on the photo-ID and, if a positive match is detected by the system of the present disclosure, the user's photo-ID credentials may be digitally signed using the user's private key, ideally in accordance with a standard such as PKCS #1 RSA Cryptography Standard Digital Signature Further referring to FIG. 3, the document or transaction that was approved or signed at step 302 may be saved in an appropriate file format and will be digitally signed using the user's private key, ideally in accordance with PKCS #1 RSA Cryptography Standard Digital Signature.

Further referring to FIG. 3, the image of the user's face captured at step 304 and the pre-authenticated image of the user's face stored in secure storage at 318, may be joined or appended to the document with associated digital signatures and the combined file may be digitally signed using the users private key, ideally in accordance with a standard such as PKCS #1 RSA Cryptography Standard Digital Signature. Examples of the combined files or "signed packages" are found in FIG. 5 and FIG. 11.

Turning to FIG. 4 there is provided an example method for inspecting a file and the digital signature(s) associated with the digitally signed file(s). To review and authenticate a document the document will be opened by a user using an appropriate file format such as PDF, XML or Word File. The document or file components that will be displayed can consist of the face that was used to authenticate (see 502 in FIG. 5) along with its corresponding digital signature(s) (see 506 in FIG. 5) the user photo-ID credentials (see 504 in FIG. 5) along with its associated digital signature(s) (see 508 in FIG. 5) and the document (see 512 in FIG. 5) along with its associated digital signature(s) (see 510 in FIG. 5). Each digital signature can be displayed in ways similar to the icons (see 506, 508 and 510 in FIG. 5). The components may be watermarked to protect them from copying. The watermark may also be linked to the document by using the hash characters to form a portion of the watermark method.

Figure 5:
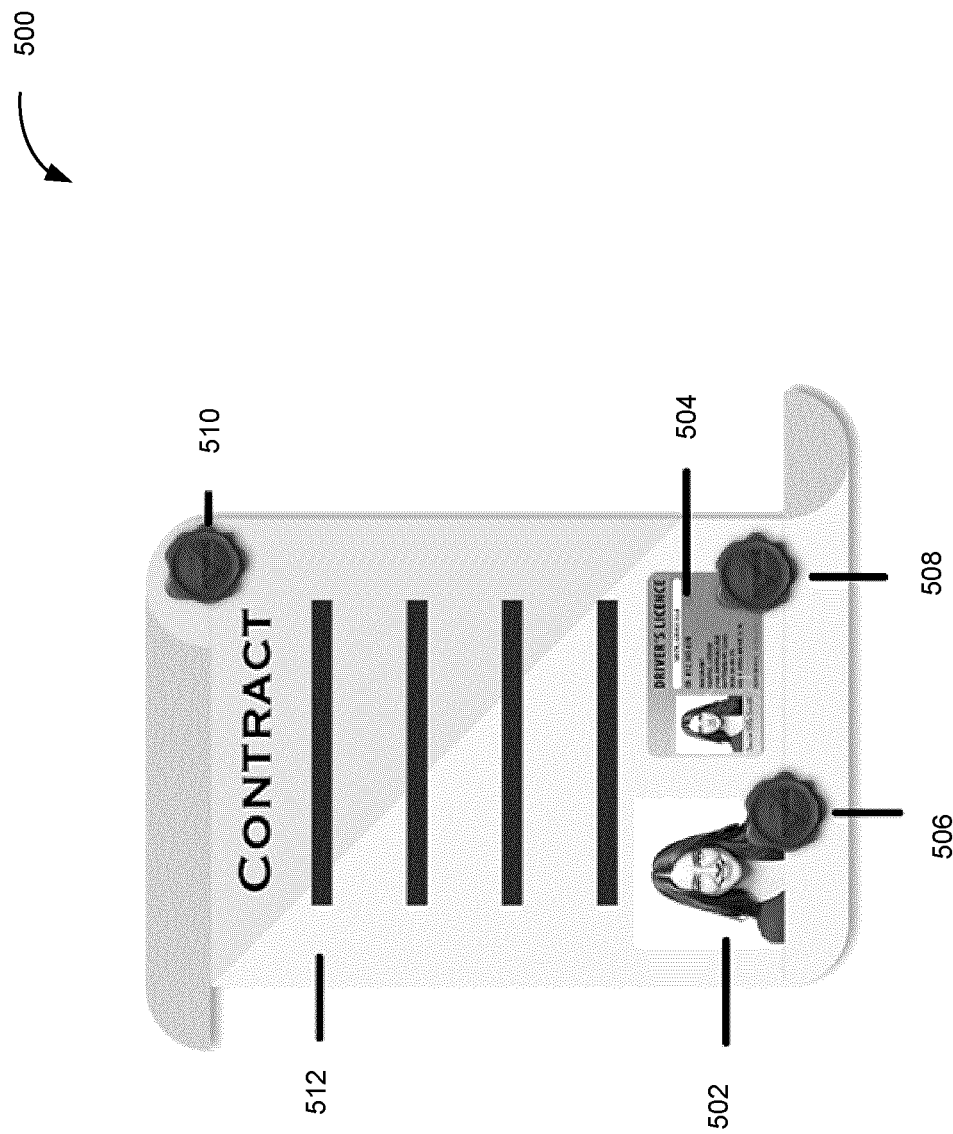
FIG. 5 illustrates an authenticated document.

Further to FIG. 4, at step 410, in order to validate each of the digital signatures the user may click one of the icons (see 506, 508 or 510 in FIG. 5) which may cause recalculation of the hash of the corresponding document or file component of either the face (see 502 in FIG. 5) the credentials (see 510 in FIG. 5) or the document (see 512 in FIG. 5). The present solution may, using the public key either included with the digital signature(s), stored in the user's Digital Certificate, in a directory such as in an LDAP or a database or similar accessible storage mechanism, decrypt the digital signature(s) and compare the decrypted message digest hash with the calculated message digest hash and, if the two match, will confirm the authenticity of the corresponding document or file component of either the face (see 502 in FIG. 5) the photo-ID credentials (see 504 in FIG. 5) or the document (see 512 in FIG. 5). Upon successful confirmation, the example method of FIG. 4 may display confirmation of the match, and therefore enable non repudiation of the file and/or digital signature(s), along with appropriate digital signature elements (e.g., who signed the document and when).

Turning to FIG. 5, there is provided an illustration of an authenticated document. As depicted in the diagram the components may include the Face of the person 502 signing the document 512, their photo-ID credentials 502 and the document itself 512. Each of these components may have corresponding Digital Signatures (506, 508 and 510).

Figure 11:
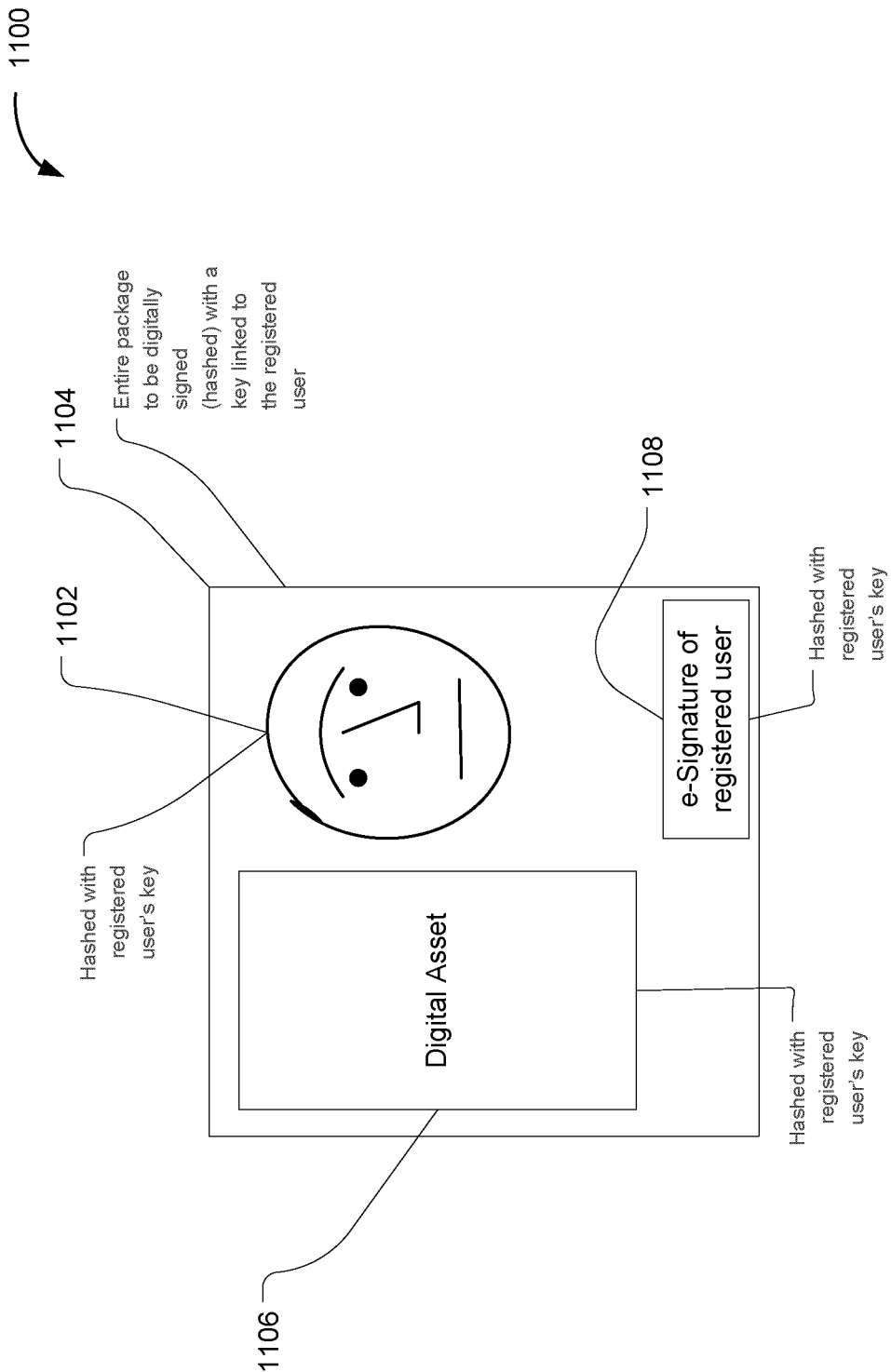
FIG. 11 illustrates a signed document package according to some embodiments.

Turning to FIG. 11, there is provided an illustration of a package of digitally signed assets 1104. The package of digitally signed assets 1104 depicted in FIG. 11 contains an electronic signature belonging to a registered user 1108, an image of a user 1102, and a digital asset 1106 (e.g., a document or other data file). According to some embodiments, each of the items forming the contents of the package of digitally signed assets 1104 may be encrypted using one or more encryption keys associated with the registered user, and in some embodiments, the package of digitally signed assets 1104 itself may also be encrypted in this fashion. Encrypting the package of digitally signed assets 1104 and/or the contents of same may, according to some embodiments, enable $3^{rd}$ parties to confirm the source and authenticity thereof.

The package of digitally signed assets can include a signing package and the one or more digital assets or the hash of the one or more digital assets. The signing package may provide electronic evidence (including biometric data) to confirm or authenticate the one or more digital assets (including an electronic signature therein). For example, the signing package can include a thumbnail image of one of the challenge images embedded on an image of. The signing package can be a modified version of the one or more digital assets that can be attached or appended to the original one or more digital assets to provide electronic evidence while keeping the original digital assets unchanged. For example, the signing package may be generated by either inserting a challenge image (or a thumbnail thereof) and/or another digital image into a document. The package of digitally signed assets includes the signing package and the document. The package of digitally signed assets is then signed using a retrieved key linked to the person identified in the challenge image or the registered image used to authenticate the challenge image.

The one or more digital assets may be stored remotely and may be large in file size. Instead of adding the actual one or more digital assets to the package of digitally signed assets instead a hash of the actual one or more digital assets can be used. The hash of the actual one or more digital assets can be received at the client device from the remote storage and the client device can perform the signing operation using the key. The hash may not be generated using the key but can be encrypted using a private key. A corresponding public key can be sent with the package of digitally signed assets. Further, there may be a watermark on all the images with the hash of the document to create a secure and trusted signing page or package.

The digital asset may involve document or transaction data that is local or remote relative to components implementing the signing process. The location of the document or transaction data may trigger different signing processes. An initial step may involve determining the location of the document or transaction data relative to the component that will implement the signing process.

The digital asset may involve document or transaction data that is local relative to components implementing the signing process. For example, a client device may implement the signing process and also store the document.

If the digital asset may involve document or transaction data that is local relative to components implementing the signing process then the actual document or transaction data may be signed and included with a signing package or authentication data to generate a package of digitally signed assets using the encryption key. For example, the signing package or authentication data can contain a digital photo or image from the challenge profile, thumbnail image of the document, an image of identification of the user, metadata for the captured image of the identification including date, name, address, photo, identification number (e.g. driver's license number), and the like. The signing package can be inserted directly into the document as a prefix or suffix, for example. The package of digitally signed assets can include the document and the signing package. The package of digitally signed assets can be signed using the encryption key.

The digital asset may involve document or transaction data that is remote relative to components implementing the signing process. For example, a client device may implement the signing process and a separate data storage device that is remote to the client device may store the document or transaction data.

If the digital asset may involve document or transaction data that is remote relative to components implementing the signing process then the signing package or authentication data may be separate from the original document or transaction data when generating a package of digitally signed assets using the encryption key. That is, the signing package may not be inserted into the document or transaction data or otherwise included as part of the document or transaction data. The signing package or authentication data can still contain a digital photo or image from the challenge profile, thumbnail image of the document, an image of identification of the user, metadata for the captured image of the identification including date, name, address, photo, identification number (e.g. driver's license number), and the like. However, the signing package (containing the items above for example) is a separate entity from the document or transaction data. The signing package may also contain a hash of the document or transaction data, or may be linked to a hash of the document or transaction data. The hash of the document or transaction data may be returned by the data storage device storing the document or transaction data. That is, signing package may also contain a hash of the document or transaction data only and not the actual document or transaction data.

The signing package is encrypted or signed using the key to ensure no tampering with the signing package. The signing package is sent to the server (as part of the authentication system 100) to be combined with the original document and presented together to verify the signature. "Signing" in this sense may mean taking a hash of the original document or transaction data or the combined package and encrypting it with a private key and using the hash as a watermark on the signing package material to ensure no copying or reuse.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, or any combination thereof.

Throughout the preceding and following discussion, numerous references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The preceding discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

One or more aspects of the technical solution provided by the embodiments described herein may be implemented in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute one or more aspects of the technical solution provided by the embodiments.

The embodiments described herein are implemented by physical computer hardware, including computing devices, servers, receivers, imaging sensors, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware elements are clearly essential to the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

FIG. 5 is a schematic diagram of computing device 500, exemplary of an embodiment for authentication using digital signatures and face signatures. As depicted, computing device 500 includes at least one processor 502, memory 504, at least one I/O interface 506, and at least one network interface 508.

Each processor 502 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables computing device 500 to interconnect with one or more input devices, such as a keyboard, mouse, camera, touch screen and a microphone, or with one or more output devices such as a display screen and a speaker.

Each network interface 508 enables computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 500 is operable to register and authenticate users (using a login, unique identifier, and password for example) prior to providing access to applications, a local network, network resources, other networks and network security devices. Computing devices 500 may serve one user or multiple users.

Although the embodiments have been described in detail, it should be understood that various changes, substitutions and alterations can be made without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An encryption/decryption system for user authentication and document authentication using face biometrics, the system comprising:
   a processor; and
   a memory storing machine-executable instructions which when executed by the processor configure the processor to:
      receive one or more challenge images for authentication and one or more digital assets;
      verify that the one or more challenge images were generated by capturing images of a live person;
      generate a plurality of challenge facial signatures by applying face detection operations to the one or more challenge images to identify one or more candidate face regions;
      create a challenge profile by linking together the plurality of challenge facial signatures;
      authenticate the challenge profile by applying face recognition operations to compare the linked challenge facial signatures to stored or pre-registered profile facial signatures and compute a similarity metric within a similarity threshold, wherein the processor is configured to:
         receive an image of an identification document;
         generate a document facial signature by applying face detection operations to the image of the identification document to identify one or more document face regions;
         compare the document facial signature to one or more of the plurality of challenge facial signatures; and
         determine a likeness score between the document facial signature and the one or more of the plurality of challenge facial signatures;
         wherein the challenge profile is authenticated when the likeness score is within a defined range or threshold;
      retrieve one or more encryption keys when the challenge profile successfully authenticates, the one or more encryption keys being linked to the stored or pre-registered profile facial signatures;
      compile a signing package of at least one of: a digital image, the one or more challenge images, and the one or more digital assets;
      compile a package of digitally signed assets containing the signing package and the one or more digital assets or a hash of the one or more digital assets;
      digitally sign or encrypt the package of digitally signed assets using the retrieved one or more encryption keys;
      transmit the package of digitally signed assets; and
      store at least one of the one or more challenge images, the challenge profile, the retrieved one or more encryption keys, the digital image, the one or more digital assets or the digitally signed package of digitally signed assets in at least one secure storage.

2. The encryption/decryption system of claim 1, wherein the processor is configured to digitally sign or encrypt the signing package using the retrieved one or more encryption keys.

3. The encryption/decryption system of claim 1, wherein to verify that the one or more challenge images were generated by capturing images of the live person the processor is configured to:
   provide an electronic prompt to request the live person to perform a sequence of one or more position requests, each position request defined by a change in pitch and yaw and roll;
   trigger an image capture device to capture sequence images of the live person performing the sequence of one or more position requests, the sequence images capturing pitch and yaw and roll movements of the live person;
   generate a series of face signatures for the sequence of images of the live person performing the sequence of the one or more position requests;
   compare the generated series of face signatures to stored face signatures corresponding to the sequence of the one or more position requests; and
   authenticate the live person as being the live person as a first authentication step.

4. The encryption/decryption system of claim 3, wherein to apply face recognition operations the processor is configured to:
   trigger the image capture device to capture at least one additional image of the live person;
   verify an identity of the live person as being an authorized user based on the at least one additional image of the live person as a second authentication step; and
   store the at least one additional image of the live person in a data storage as an audit trail.

5. The encryption/decryption system of claim 1, wherein the face detection operations applied to the one or more challenge images comprise illumination correction operations on the one or more challenge images to train the processor to eliminate shadows, glares or other lighting issues.

6. The encryption/decryption system of claim 1, wherein a facial signature is a set of values that uniquely identifies a face relative to other faces.

7. The encryption/decryption system of claim 1, wherein the digital image of the signing package includes one or more of:
   an image of an identification card,
   a thumbnail image of the one or more digital assets,
   metadata for one or more of the one or more challenge images,
   one or more of the one ore more challenge images, or
   a thumbnail image of one of the one or more challenge images.

8. The encryption/decryption system of claim 1, wherein the signing package is a separate electronic document page that can be added to the one or more digital assets to compile the package of digitally signed assets.

9. The encryption/decryption system of claim 1, wherein the signing package includes a thumbnail image of one of the one or more challenge images embedded on an image of the one or more digital assets or the hash of the one or more digital assets.

10. The encryption/decryption system of claim 1, wherein the processor is configured to:
   create a registered profile by storing the challenge profile in a secure storage;

create one or more registered encryption keys by storing the one or more encryption keys linked to the challenge profile in the secure storage; and create one or more registered assets by storing the one or more challenge images and one or more of the digital assets in the secure storage.

11. The encryption/decryption system of claim 1, wherein the processor is configured to:

communicate one or more digitally signed data files over a data network responsive to determining the challenge profile is successfully authenticated, the one or more digitally signed data files signed using a key pair, encrypted with a private key and making available a public key for decryption.

12. The encryption/decryption system of claim 1, wherein the processor is configured to:

generate a notification message indicating whether or not the challenge profile was successfully authenticated; and communicate the notification message and one or more of the one or more challenge images to an enrolled user.

13. The encryption/decryption system of claim 1, wherein the processor is configured to perform an image pre-processing step comprising:

correcting a pose of a face captured during registration or authentication in a challenge image to be re-oriented to a frontal position.

14. The encryption/decryption system of claim 1, wherein the processor is configured to perform an image pre-processing step comprising:

correcting a face captured during registration or authentication in a challenge image to eliminate or reduce noise caused by illumination.

15. The encryption/decryption system of claim 1, wherein the one or more challenge images are produced from one or more video frames of a video file and the processor is further configured to store the video file in the at least one secure storage.

16. The encryption/decryption system of claim 1, wherein the processor is configured to provide access to the one or more encryption keys, data files stored in secure storage, or other encrypted digital assets.

17. An encryption/decryption system for user authentication and document authentication using face biometrics, the system comprising:

a processor; and a memory storing machine-executable instructions which when executed by the processor configure the processor to:

receive one or more challenge images for authentication and one or more digital assets to be digitally signed upon successful authentication of the one or more challenge images;

generate a plurality of challenge facial signature values by applying face detection operations to the one or more challenge images to identify one or more candidate face regions;

create a challenge profile by linking together the plurality of challenge facial signature values;

authenticate the challenge profile by applying face recognition operations to compare the linked challenge facial signature values to stored or pre-registered profile facial signature values and compute a similarity metric within a similarity threshold, wherein the processor is configured to:

receive an image of an identification document;

generate a document facial signature by applying face detection operations to the image of the identification document to identify one or more document face regions;

compare the document facial signature to one or more of the plurality of challenge facial signature values; and determine a likeness score between the document facial signature and the one or more of the plurality of challenge facial signature values;

wherein the challenge profile is authenticated when the likeness score is within a defined range or threshold;

retrieve one or more encryption keys when the challenge profile successfully authenticates, the one or more encryption keys being linked to the stored or pre-registered profile facial signature values;

digitally sign a signing package of at least one of: a digital image, the one or more challenge images, and the one or more digital assets using the retrieved one or more encryption keys;

compile a package of digitally signed assets containing the signing package and the one or more digital assets or a hash of the one or more digital assets;

digitally sign the package of digitally signed assets using the retrieved one or more encryption keys;

transmit the package of digitally signed assets; and store at least one of the one or more challenge images, the challenge profile, the retrieved one or more encryption keys, the digital image, the one or more digital assets or the digitally signed package of digitally signed assets in at least one secure storage.

* * * * *